United States Patent [19]
Miller

[11] 3,821,518
[45] June 28, 1974

[54] POSITION AUTHENTICATION SYSTEM FOR INFORMATION-BEARING DEVICES

[76] Inventor: David M. Miller, 236 E. 36th St., New York, N.Y. 10016

[22] Filed: Aug. 10, 1972

[21] Appl. No.: 279,711

[52] U.S. Cl. ... 235/61.11, 235/61.7 B, 235/61.12 R, 340/149 A
[51] Int. Cl. ........................ G06k 7/06, G06k 19/06
[58] Field of Search 235/61.7 B, 61.11 A, 61.12 M; 340/149 A

[56] References Cited
UNITED STATES PATENTS

| | | | |
|---|---|---|---|
| 2,288,770 | 7/1942 | Armbruster | 235/61.11 A |
| 2,706,599 | 4/1955 | Smith | 235/61.11 A |
| 3,617,706 | 11/1971 | Oberhart | 235/61.7 B |
| 3,627,991 | 12/1971 | Beall et al. | 235/61.7 B |
| 3,627,994 | 12/1971 | Sallach et al. | 235/61.7 B |
| 3,643,216 | 2/1972 | Greenaway et al. | 235/61.7 B |
| 3,657,521 | 4/1972 | Constable | 235/61.7 B |
| 3,665,161 | 5/1972 | Oberhart | 235/61.7 B |
| 3,676,644 | 7/1972 | Vaccaro | 235/61.12 M |

*Primary Examiner*—Daryl W. Cook
*Attorney, Agent, or Firm*—Stephen E. Feldman

[57] ABSTRACT

A position authentication system for information-bearing devices, such as credit cards or the like, includes an information-bearing device having a plurality of authentication positions defined when the device is disposed in a predesignated reference position relative to a reader for reading said device. A plurality of authentication zones are defined on the device, one or more zones being associated with each distinct authentication position of the device and including means for defining a distinct readable code therein, such as a binary coded word. The reader reads the device in any of its authentication positions by reading the readable code defined in the predesignated authentication zone associated with the actual authentication position of the device.

62 Claims, 35 Drawing Figures

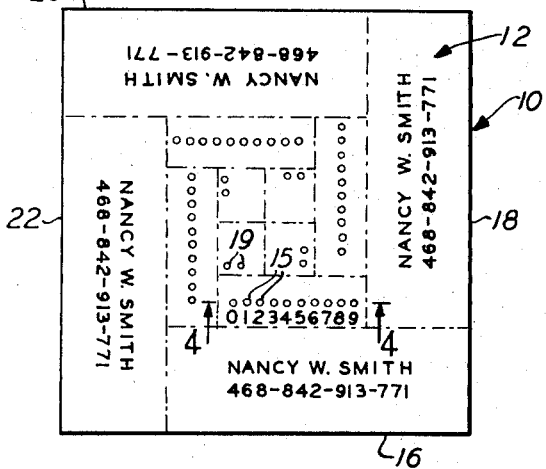
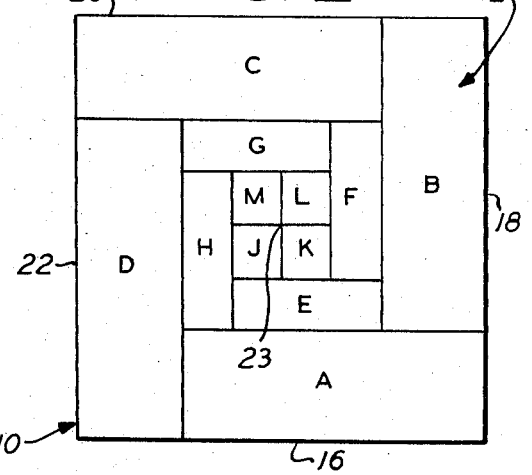
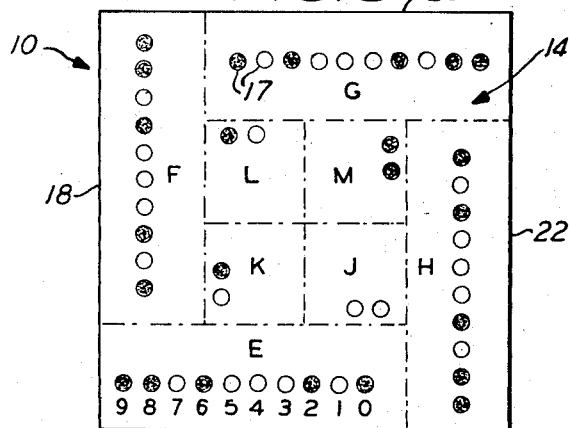
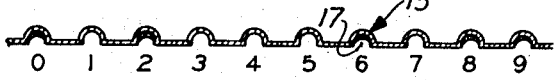
FIG. 5
| ZONE | BINARY WORD |
|------|-------------|
| E | 1010001011 |
| F | 1010001011 |
| G | 1010001011 |
| H | 1010001011 |
| J | 00 |
| K | 01 |
| L | 10 |
| M | 11 |
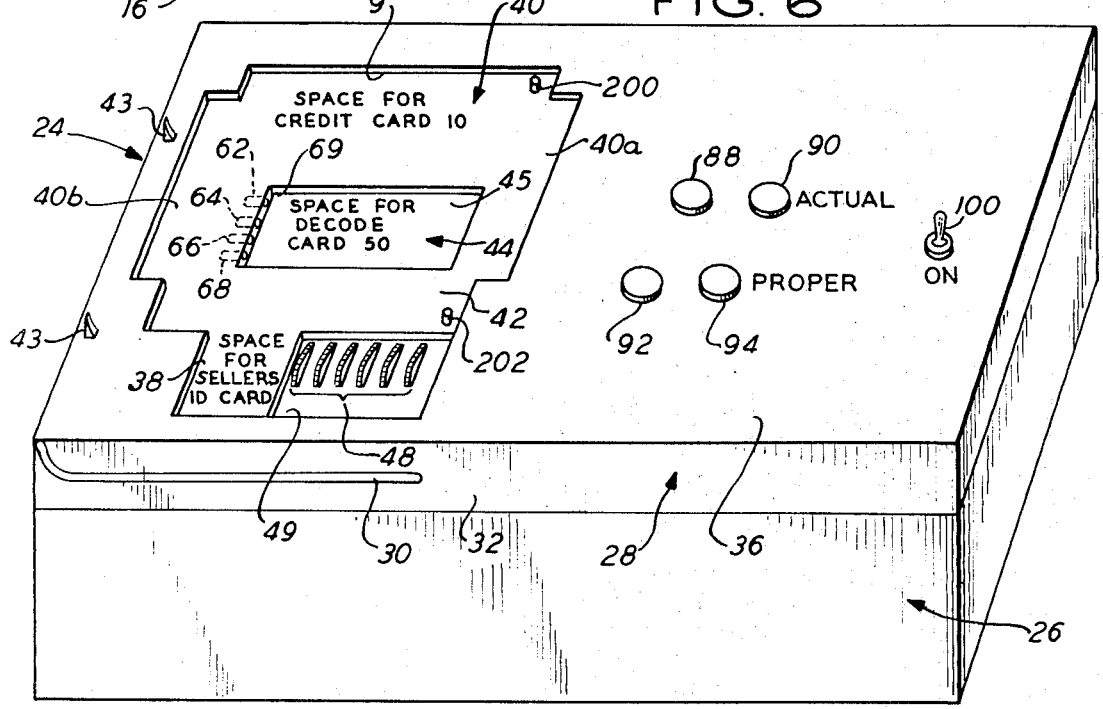

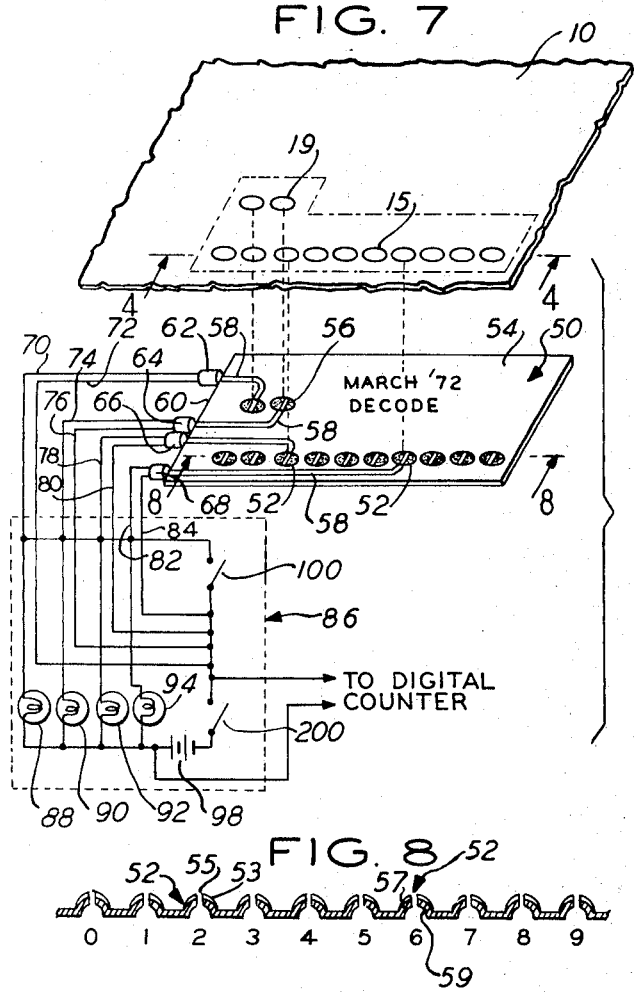
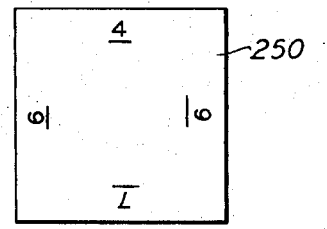
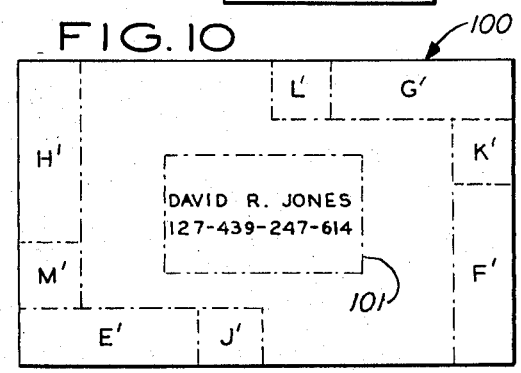
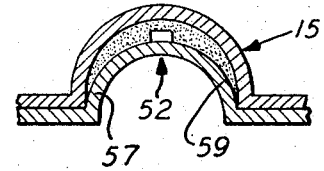
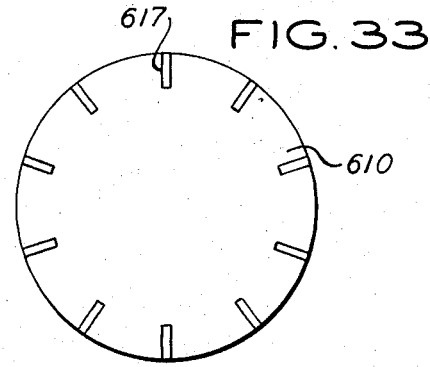
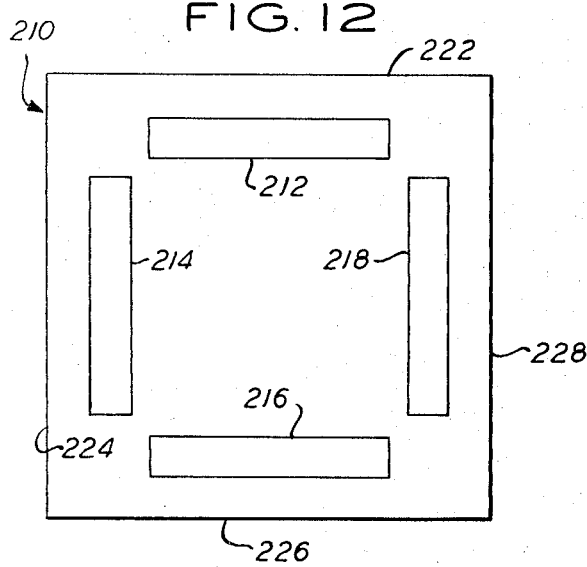
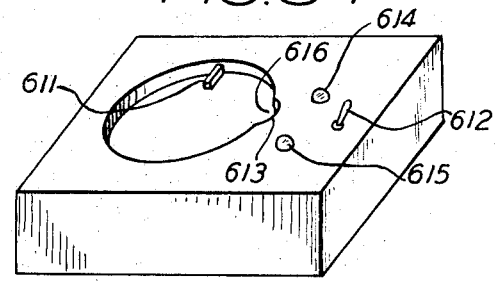

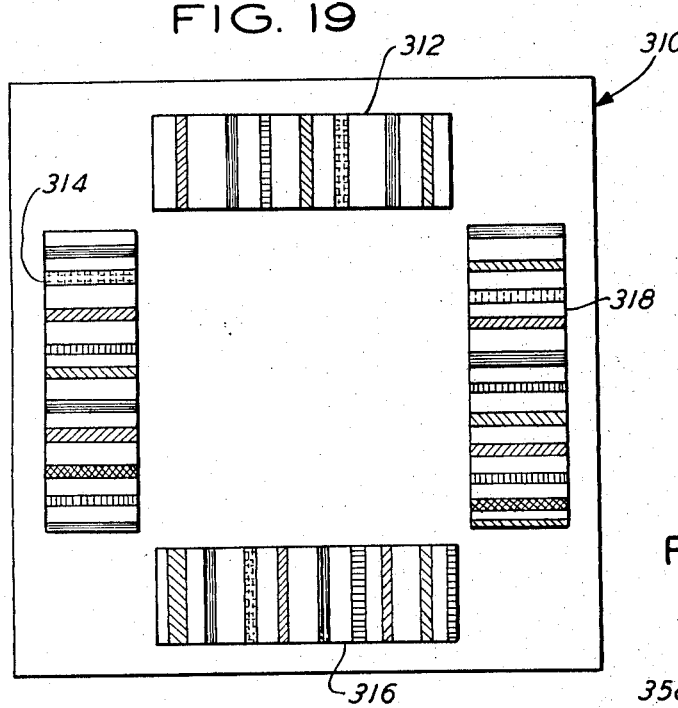
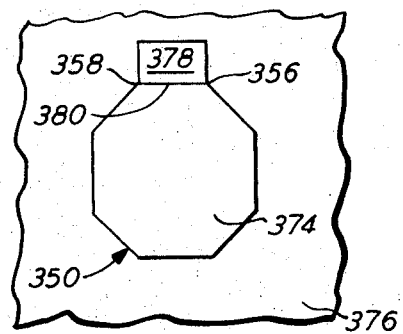
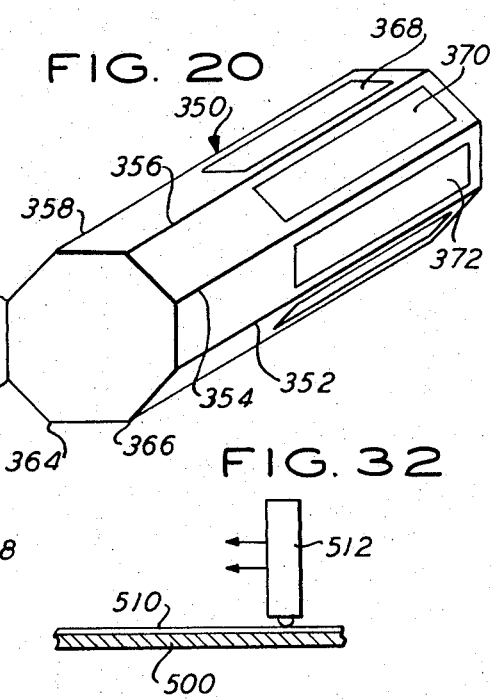
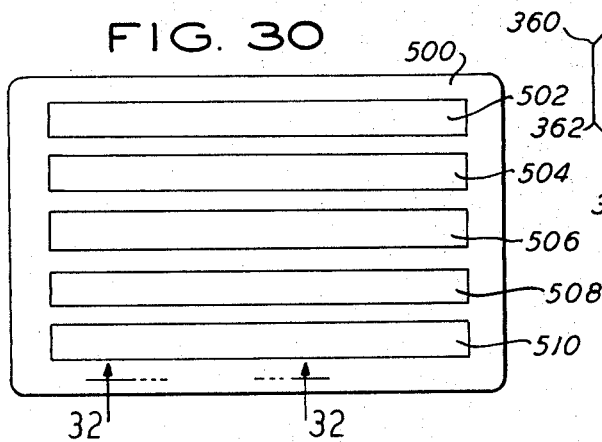
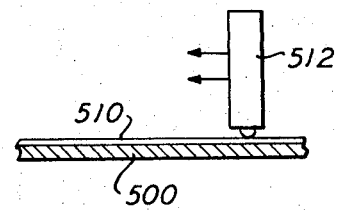
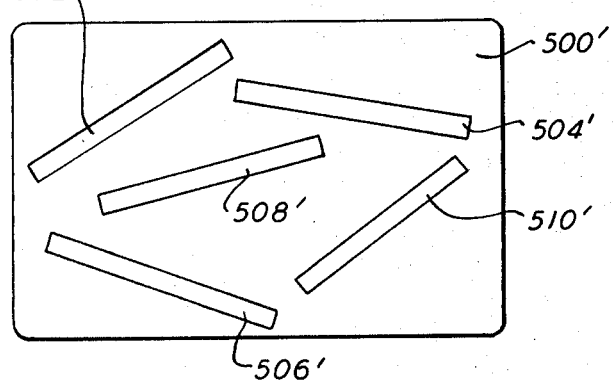
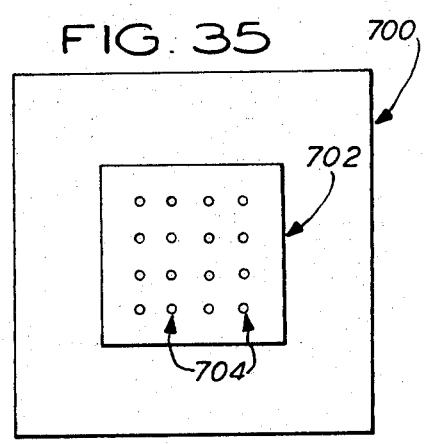

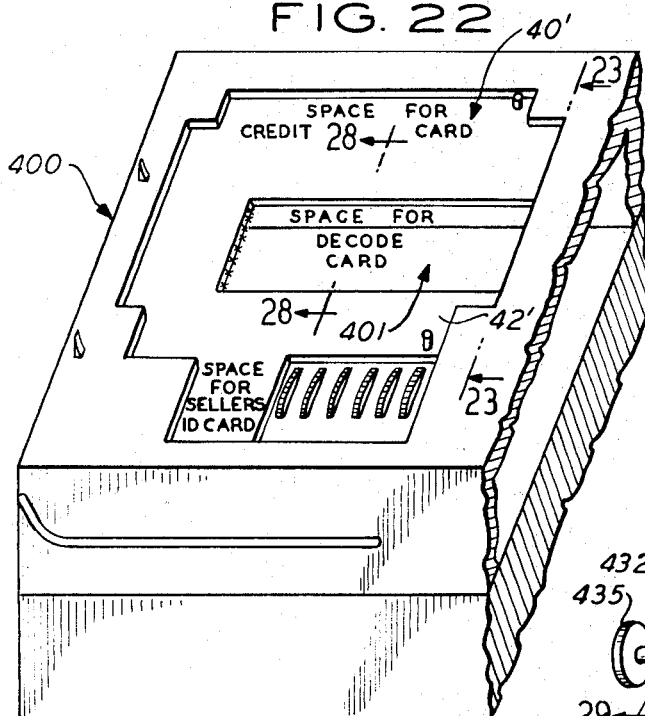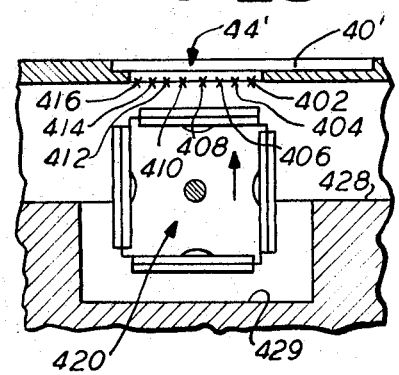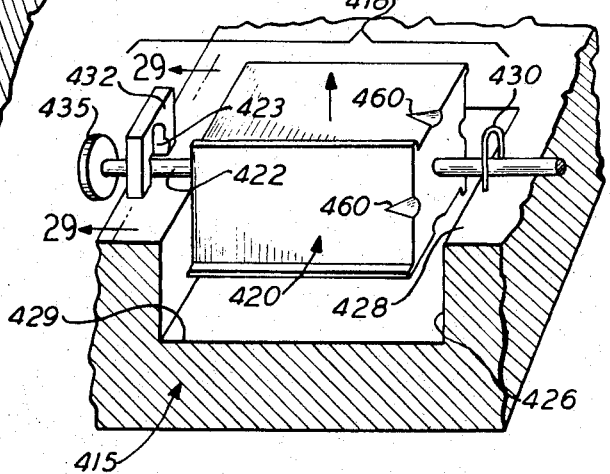

POSITION AUTHENTICATION SYSTEM FOR INFORMATION-BEARING DEVICES

BACKGROUND OF THE INVENTION

1. Field of the Invention

This invention relates to information-bearing devices, such as keys or credit cards, or the like. More particularly, this invention relates to a position authentication system for information-bearing devices of the above type to reduce the unauthorized use thereof.

2. Description of the Prior Art

We live in a credit card society! The use of credit cards as a means for purchasing goods and services has become so widespread as to threaten replacing cash or checks as a means of payment. It is not uncommon for some families to have upwards of a dozen credit cards, most of which are carried around in the wallets of one or more persons of each such family.

A significant problem that has arisen from the widespread and exponentially increasing use of credit cards is the just as rapidly rising unauthorized use thereof. The fact that this constitutes a crime provides only a partial deterrent to unauthorized use. Thus, many people who find lost or misplaced wallets containing numerous credit cards are tempted into unauthorized use of the cards. There apparently is even a black market in lost or stolen credit cards wherein such cards are sold for predesignated sums depending upon the credit card.

Needless to say, the unauthorized use of credit cards must be eliminated entirely, or at least significantly reduced at present. In an effort to achieve this result, various card authentication schemes have been developed. All of these schemes have a common theme in that they seek to somehow designate to the seller of goods or services a single proper user of the card.

For instance, one such authentication system for credit cards is shown in U.S. Pat. No. 3,245,697 issued on Apr. 12, 1966 to W. J. Nugent. Nugent's system is defined primarily by his credit card which is a generally opaque card having transparent areas defining coded information therein. The card is a multi-layer assembly wherein the information layers are laminated between two outer protective layers. Although Nugent's system is directed primarily to unauthorized counterfeiting of credit cards, his card is also provided with appropriate means for identifying the proper bearer or owner of the card, as by name and/or photograph which become visible only upon exposure to ultraviolet light or the like. Although Nugent provides a workable system, it is relatively expensive to implement and therefore has not been widely accepted in the industry.

U.S. Pat. No. 3,339,473, issued Sept. 3, 1968 to N. A. Jaffe discloses another credit card authentication system which employs the use of a "combination" credit card thereby restricting use of the card to only those who know the combination. Jaffe's system requires the costly manufacture of a credit card bearing combination dials, such as shown in FIG. 1 of the Patent. Such costs and the combersome configuration of the card (its inability to be conveniently carried in a wallet or the like) have detracted from the commercial feasibility of Jaffe's system.

It would be desirable to have an inexpensive and uncomplicated authentication system for credit cards wherein the cards would closely resemble present day credit cards, such as being substantially planar and otherwise dimensioned to conveniently fit in a person's wallet. Furthermore, it would be desirable if the usage of such cards could be authenticated with as little, or no, additional thinking and manual manipulation by the credit card holder or the seller of goods or services than now performed with regard to conventional credit card use.

Thus, it would be desirable if the credit card holder need not have to memorize a combination or number, particularly since such combination or number may be varied periodically by the card company to limit card use by persons having accounts in arrears. Additionally, it is further desirable to eliminate signature verifications in credit card use so that a subjective signature comparison may be avoided and also so that the cards may be used with automatic machines, such as gates or dispensing machines.

SUMMARY OF THE INVENTION

The above desirabilities have been met in accordance with the credit card authentication system of this invention.

Generally speaking, the present invention relates to a position authentication system for information-bearing devices, such as credit cards or the like. The system comprises an information-bearing device having a plurality of edges and a plurality of authentication positions defined when each edge is disposed in a predesignated reference position relative to a reader for reading said device. A plurality of authentication zones are defined on the device, each zone being associated with a distinct authentication position of the device and including means for defining a distinct, readable code, such as a binary coded word, for example, therein. The reader reads the device in any of its authentication positions by including means therein for reading a first coded word defined in the authentication zone associated with the actual authentication position of the device.

As used in this invention, the term "readable code" shall be deemed to include not only digital codes, such as binary coded words, which may either be optically, magnetically or physically readable, but also analog codes, such as holograms or any optically, magnetically or physically readable analog codes.

In one embodiment of this invention, the information-bearing device is a planar card with the authentication zones being defined on the surface thereof. Further, the readable code is preferably a digital code and, most preferably, a set of binary coded words.

With reference to this specific embodiment, and assuming that a single proper authentication position is known, the binary word read will determine if the card was placed in such proper authentication position. If the card was improperly placed, such being indicated by an incorrect binary word being read, this indicates that either the bearer of the card is not the true owner, or that the owner incorrectly positioned or directed the positioning of the card with respect to the reader. In either case, the card should be confiscated by the seller of goods or services and returned to the credit card company. The inconvenience this would cause the true credit card holder is far outweighed by the fraud limiting aspects thereof.

The credit card authentication system above defined preferably uses a credit card substantially identical to present day credit cards, as far as being generally planar and of wallet size. There are no costly combination dials or multi-laminate layers for the card as in the above-discussed prior art patents. Furthermore, no signature verification is required.

In a preferred embodiment, the card reader further includes means for providing a first indication of the first binary coded word read, as indicative of the actual authentication position of the card in the reader; and means for preselecting one of the card authentication positions as a single proper card authentication position by providing a second indication of a second binary coded word associated with said one card authentication position, the card being properly inserted in the reader in the single proper card authentication position only when the first and second indications are at a predetermined relation, such as, preferably, being matched.

A person using the above card must position it in the card reader in only a single proper card authentication position predesignated and preselected for each month. This single proper authentication position is defined by the second binary-coded word indicated by the second indication provided by the reader. Only when the card is actually inserted in the single proper card authentication position will the first binary-coded word read from the associated authentication zone on the card, and indicated by the first indication, match the second binary-coded word indicated by the second indication.

In the above manner, the seller of goods or services need not perform any manual manipulations or mental gymnastics to arrive at a card's authentic use. He need only compare the first and second indications generated by the reader to see if they are matched; if not, the card is being improperly used which may indicate an unauthorized user.

In accordance with this system, it is preferred that the credit card company send a statement out each month to the credit card holder bearing authentication instructions to inform him of the valid, i.e., single proper, authentication position of the card for the coming month. It is then up to the credit card holder to insert or direct a proper insertion of the card in the reader, i.e., with the edge associated with the valid authentication position on the reader, so that a valid use will be indicated. Selectivity of recipients of such instructions in the statements would have the effect of prohibiting further card use by card holders having accounts in arrears.

The cards are preferably each substantially symmetrical, both physically and visually about their centers so that no matter which way the card is held, it appears identical to the viewer. This makes it impossible for a person finding the card to distinguish the proper authentication position just by looking at the card, even if he has previously seen the proper use of the card. The registered credit card holder can, of course, maintain surveillance over the proper credit card position by appropriately orienting it in his wallet each month.

These and other aspects and advantages of this invention, such as the manner of encoding the authentication zones and the manner of providing the first and second indications, as well as numerous other embodiments of this invention will be clearly described below with reference to the accompanying drawings.

BRIEF DESCRIPTION OF THE DRAWINGS

FIG. 1 is a top plan view of an information card in accordance with the authentication system of this invention;

FIG. 2 shows various zones defined on a surface of the card shown in FIG. 1;

FIG. 3 is an enlarged bottom plan view of a portion of the card shown in FIGS. 1 and 2;

FIG. 4 is a side cross-sectional view of the card of FIG. 1 taken along lines 4—4;

FIG. 5 is a chart showing the binary-coded words defined on the various zones of the card of FIG. 1;

FIG. 6 is a perspective view of the top of a card reading apparatus of the system of this invention;

FIG. 7 is an exploded perspective view of the card of FIG. 1 as disposed on a decode card in the card reading apparatus of FIG. 6; a decode circuit of such reading apparatus in also shown in schematic;

FIG. 8 is a side cross-sectional view of the decode card of FIG. 7 taken along lines 8—8 of FIG. 7;

FIG. 9 is a side cross-sectional view of the card of FIG. 1 as disposed on top of the decode card as taken along lines 4—4 of FIG. 7 and lines 8—8 of FIG. 7;

FIG. 10 is a top plan view of another information card of this invention;

FIG. 12 is a top plan view of another information card of this invention;

FIG. 18 is a top plan view of another position orientation device of this invention;

FIG. 19 is a top plan view of yet another information card of this invention;

FIG. 20 is a perspective view of a prismatic information-bearing device of this invention which is preferably used as a key;

FIG. 21 is a side cross-sectional view of a keyhole and reading device for use with the key of FIG. 20;

FIG. 22 is a perspective view of a segment of another reader of the authentication system of this invention;

FIG. 23 is a cross-sectional view of the reader of FIG. 22 taken along lines 23—23 of FIG. 22;

FIG. 24 is a perspective view of a segment of the reader shown in FIG. 22, but with the cover thereof removed to reveal a decode card drum mounted in the reader;

FIG. 25 is an enlarged perspective view of the decode card drum shown in FIG. 24 with four decode cards being mounted thereon;

FIG. 26 is a cross-sectional view of a decode card to be mounted to the drum of FIG. 25 for use in the reader shown in FIG. 22;

FIG. 27 is a cross-sectional view of the reader of FIG. 22 taken along lines 23—23 of FIG. 22, but with the decode cards shown mounted on the drum, as in FIG. 25;

FIG. 28 is a cross-sectional view of the reader of FIG. 22 taken along lines 28—28 of FIG. 22 (also lines 28-28 of FIG. 25);

FIG. 29 is a cross-sectional view of a detent and guide assembly used in the reader of FIG. 22 taken along lines 29—29 of FIG. 24;

FIG. 30 is a top plan view of yet another information card of this invention;

FIG. 31 is a top plan view of still another information card of this invention;

FIG. 32 is a fragmentary cross-sectional view of the card of FIG. 30 taken along lines 32—32 of FIG. 30 also showing diagrammatically, and in elevation, a device for reading the zones on the card;

FIG. 33 is a view of another embodiment, a circular card;

FIG. 34 is a perspective view of a reading apparatus for the card of FIG. 33; and FIG. 35 is a top plan view of still another information card of this invention.

DESCRIPTION OF THE ILLUSTRATED EMBODIMENTS

Figure 11:
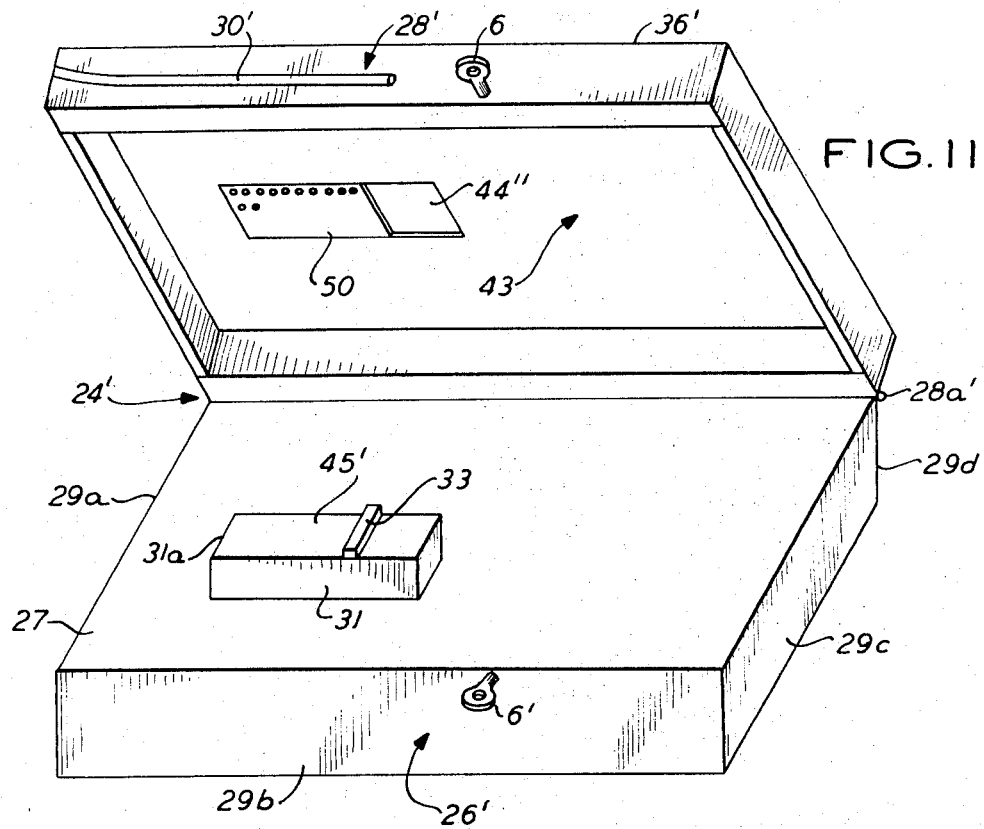
FIG. 11 is a perspective view of an alternative reader of this invention.

Referring to FIGS. 1-3, a credit card 10 used in an authentication system of this invention is shown. Card 10 is substantially planar and preferably has the shape of a symmetrical polygon. Most preferably, card 10 is square in shape and is otherwise dimensioned to conveniently fit in the credit card compartment of a standard wallet (not shown). Thus, card 10 has a substantially planar upper surface 12 and a parallel, substantially planar lower surface 14.

Upper surface 12 is subdivided into a plurality of zones A–M wherein zones A–D are hereinafter referred to as "imprinted-information" zones, zones E–H are hereinafter referred to as "encoded-information" zones, and zones J–M are hereinafter referred to as "encoded-authentication" zones.

Each of imprinted-information zones A–D contains the identical printed information, such as the name and account number of the registered card user, embossed thereon by conventional embossing techniques. It is preferred, though not essential, that such printed information on each zone be located an identical distance from the center 23 of the card so that the card retain its physical symmetry.

Furthermore, if card 10 is colored, it is preferred that the coloring by symmetrical about center 23 of the card. As shall be described below, imprinted-information zones A–D, although preferred, are not necessary for proper authentication in accordance with the authentication system of this invention.

Encoded-information zones E–H each include means thereon for defining a binary-encoded word, the word in each encoded-information zone being identical and being disposed symmetrically about the center of card 10. More specifically, each encoded-information zone preferably contains a plurality of embossed dots 15 thereon extending upwardly from upper surface 12 of the card, and thereby defining a corresponding plurality of hemispherical depressions 17 in lower surface 14 of the card.

Referring to FIG. 3, certain preselected embossed dots 15 in each encoded-information zone have their interiors, i.e., the corresponding depressions 17 in surface 14, filled with an energy-translative material, such as conventional electrically conductive ink, optically reflective ink or magnetic ink sprayed or painted therein. For purposes of example, electrically conductive ink is used in the embodiment of FIGS. 1-9.

As used hereinafter, the term "energy-translative area" is defined as an area which is responsive to energy by either transmitting, conducting or reflecting it. As examples, an electrically conductive area may be said to translate energy by conducting a current and an optically reflective area may be said to translate energy by reflecting light off of it. In this application, the term "energy-translative area" is therefore deemed to include at least both above types, as well as magnetic recording mediums for storing magnetic data.

The presence or absence of conductive ink in the embossed dots can define the two binary states. More specifically, and by way of example, those embossed dots that have been filled with conductive ink shall represent a binary "1," whereas those embossed dots without electrically conductive ink shall represent a binary "0." As pointed out above, each of encoded-information zones has the identical binary word therein.

The binary coding of each encoded-information zone is as follows: The first five bits represent a five bit binary value encoded from the credit card number, i.e., each credit card number in the system is assigned a five-bit binary word. The next five bits of the binary word in each zone represent the complements of the first five bits so that the number of binary "1" bits equals the number of binary "0" bits.

It has been found that when there are only four possible authentication positions, as with the case of card 10, each information zone preferably contains a 10-bit binary word selected in the manner above described. Equality of binary "1" and binary "0" bits is preferred from a probability standpoint, i.e., the probability of an unauthorized user correctly using the card is reduced when the two binary states are equal in number. The reasoning for the above is more fully explained below.

For purposes of example, zones E–H each have the identical binary word 1010001011 defined therein as shown in the chart of FIG. 5. For purposes of future explanation of the operation of the system, the 10 embossed dot positions in each encoded-information zone shall be numbered 0–9 from left to right when looking from the top (see zone E, FIGS. 1 and 3).

Card 10 has four identically dimensioned edges 16, 18, 20 and 22 which are symmetrical about the center 23 of the card due to the symmetrical polygon shape of the card. As will be described in more detail below, each encoded-authentication zone J–M is associated with a distinct edge and correspondingly distinct authentication position of the card.

Each encoded-authentication zone has a unique binary coded word defined therein. When the card has four edges with zones on only one surface, as with card 10, each encoded-authentication zone preferably contains a unique pair of binary-coded embossed dots 19 (binary bits) defined therein. The two binary bits in each of zones J–M define a unique binary word which is associated with a distinct card edge and a correspondingly distinct authentication position of the card in a card reader (described below). As will also be described more fully below, each distinct authentication position of card 10 is defined when a different edge of the card is at a preselected reference position on a card reader when the card is inserted in the reader. Since each encoded-authentication zone has a unique two-bit binary word stored therein, it can be said that each such zone is associated with a distinct authentication position of the card.

In the example of FIG. 3, none of the embossed dots of zone J contain electrically conductive ink in the interior thereof, i.e., in the corresponding depressions in lower surface 14. The binary word "0–0" is thus defined in zone J which shall, for purposes of example, be associated with edge 16 of the card. Similarly, the right embossed dot only of zone K (the upper dot as shown in FIG. 3) contains electrically conductive ink therein so that the binary word "0–1" is defined in zone K. This binary word is associated with edge 18 of the card. In a similar manner, zone L has the binary word "1–0" encoded therein and is associated with edge 20 of the card, whereas zone M has the binary word "1–1" encoded therein which is associated with edge 22 of the card.

It should be noted that to maintain visual symmetry of the card 10 about its center 23, all embossed dots in all zones on the card which do not contain electrically conductive ink preferably contain nonconductive ink visually indistinguishable from the conductive ink. Such nonconductive ink has been deleted from the drawing for purposes of clarity.

In a manner more fully described below, the binary words stored in the encoded-information zones are used to identify or preselect one of the authentication positions of the card as a single proper authentication position for inserting the card in a card reader (described below); whereas the binary words stored on encoded-authentication zones J–M are used to indicate the actual position in which the credit card is inserted or positioned in the card reader.

Referring now more particularly to FIGS. 6–9, the manner of, and apparatus for, authenticating the use of credit card 10 is more clearly described. Thus, a credit card reader/imprinter (reader) 24 includes a hollow base portion (base) 26 having a cover 28 which has been modified in accordance with this invention. Cover 28 is about 1 inch in thickness and has a pair of grooves 30 defined in both the front and rear surfaces 32 and 34, respectively, of the cover. Grooves 30 are aligned and cooperate to guide the axle of a conventional roller mechanism (not shown). When the roller mechanism is attached, it may be reciprocated back and forth along, and in engagement with, an upper surface 36 of cover plate 28 for reasons described below.

In accordance with this invention, upper surface 36 includes a pair of generally square-shaped indentations 38 and 40. Indentations 38 and 40 both extend beneath upper surface 36 of reader 24, a distance so that when a credit or information card of standard thickness is placed therein, the upper surface of the cards will be coplanar with the upper surface 36 of reader 24.

Indentation 40 includes a pair of notches 40a and 40b defined in opposing sides of indentation 40, the notches being identically dimensioned and cooperating to enable conventional rectangular-shaped credit cards to be placed in indentation 40. More specifically, indentation 40 is generally square-shaped except for notches 40a and 40b, wherein the distance between the opposing extremities of notches 40a and 40b substantially equals the length of a conventional rectangular credit card.

Excluding the areas added by notches 40a and 40b to indentation 40, the remaining square-shaped indentation has dimensions substantially equal to that of the unique binary coded, square-shaped credit cards of this invention, such as card 10 for example. Thus, either conventional credit cards or the credit cards of this invention may be accommodated in indentation 40.

Indentation 40 extends down to a subsurface 42 against which a credit card, such as card 10 of this invention, will rest when placed in the indentation. Subsurface 42 itself contains an indentation 44 of approximately equal thickness as each of indentations 38 and 40 and extends down to a second subsurface 45 within cover 28. Indentation 44 is otherwise dimensioned, such as with respect to width and length, to receive a unique decode card 50 (FIG. 7) of this invention. Actually, indentation 44 is longer than the length of decode card 50, an amount so that the card may be slid back and forth within the space formed by indentation 44. The precise manner and purpose of inserting card 50 in indentation 44 and on top of surface 45 is more clearly described below.

Upper surface 36 of cover 28 further includes a plurality of conventional rotatable print wheels 48 mounted in corresponding apertures in the cover about an axle (not shown) carried in the cover. Wheels 48 contain raised digits on them wherein the wheels are used to imprint the uppermost digit on each wheel onto a transaction slip. The wheels are positioned in a well 49 to facilitate the rotation thereof for proper digit selection and to have the uppermost digit coplanar with the embossed data on card 10 when the latter is placed on the surface formed by indentation 40.

In order to record a transaction, as opposed to authenticating card use (which will be described below), all that need be done is to place the credit card (whether conventionally rectangular or square) and the seller's indentification card (not shown) within indentations 40 and 38, respectively. Then, in accordance with known and conventional techniques, a conventional multilayered transaction slip (not shown) is placed on top of upper surface 36 being held in position by tabs 43 extending from surface 36 and adapted to be received within corresponding holes on the slip. With the slip in position, the roller (not shown) is then reciprocated back and forth along its track defined by grooves 30. The force between the roller and the embossed information on the cards and print wheels causes such information to be imprinted on the paper layers of the slip (not shown).

In accordance with this invention, reader 24 has been modified to include the unique card authentication system of the invention. Basically, the system makes use of a decode card 50 (FIG. 7) which is preferably changed each month, for reasons described below, and which is preferably fabricated of a plastic material to which electrically conductive ink adheres when sprayed or painted thereon.

A plurality of embossed dots, substantially identical to embossed dots 15 are included on card 50 and are arranged in two rows. One row has 10 embossed dots 52 which extend upwardly from an upper surface 54 of card 50. Embossed dots 52 are spaced identically as embossed dots 15 of each of encoded-information zones E–H and are similarly dimensioned so that when card 10 is placed on top of card 50, embossed dots 52 will mate with the depressions 17 in lower surface 14 of card 10 formed by those embossed dots 15 of card 10 with which embossed dots 52 are aligned.

Another row of embossed dots 56 is defined on decode card 50 above embossed dots 52. There are two embossed dots 56 which bear the same positional relation relative to embossed dots 52 as embossed dots 19 of encoded-authentication zone J, for example, bear to encoded-information zone E. Embossed dots 56 are dimensioned to mate with the depression in surface 14 of card 10 formed by the embossed dots of the aligned encoded-authentication zone. Thus, when card 10 is placed on top of card 50, embossed dots 52 and 56 will be respectively mated within the aligned embossed dot depressions in lower surface 14 of card 10 (see FIGS. 7 and 9).

In accordance with this invention, at the beginning of each month a different decode card 50 is inserted in indentation 44. As more clearly described below, each monthly decode card 50 cooperates with the binary words on the encodedinformation zones of credit card 10 to select one of the authentication positions of the card as a single proper authentication position for inserting card 10 in indentation 40.

Each monthly decode card has all of its embossed dots 52 and 56 coated with electrically conductive ink on the upper surfaces 53 (FIG. 8) thereof. The coating of conductive ink on embossed dots 52 and 56 is actually only a partial coating with a conductive-ink gap 55 separating the conductive ink on each such embossed dot into two disconnected halves 57 and 59 (FIG. 8).

Four of the conductively coated dots 52 and 56 (FIG. 7) on card 50 are connected in circuit between a distinct pair of a plurality of lead lines 58, preferably printed on upper surface 54 of the card. More specifically, one conductive half of each of the embossed dots 52 and 56 which is in circuit is connected to one lead line 58 of the pair and the other half is connected to the other lead line 58 of the pair. Each lead line terminates in a free end (not shown) extending outwardly from a side edge 60 of card 50, which free end is adapted to be received within a corresponding matable plugin connector (described below).

Preferably, upper surface 54 of decode card 50 is covered with an opaque paint except for embossed dots 52 and 56 in order to conceal lead lines 58 from visual observation. This is necessary to prevent visual observation of those embossed dots connected in circuit. For reasons described below, in each monthly decode card the binary bit positions connected in circuit may vary.

The pair of leads 58 connected to the sixth bit position dot 52 may be connected to a standard dual-in-line connector 68. Similarly, a pair of leads 58 are coupled to the second bit position dot 52 and may be connected to another connector 66. Also, two other pairs of leads 58 respectively connect both dots 56 to connectors 64 and 62. Connectors 62-68 are each standard dual-in-line connectors and, as best shown in FIG. 6, are each mounted in a side wall 60 of indentation 44 with the receiving ends thereof communicating into indentation 44. Although the use of dual-in-line connectors is shown in the embodiment of FIG. 6, this invention contemplates the use of any conventional electrical coupling device.

A decode card 50 may be inserted in indentation 44 on surface 45 toward the right end of the indentation. The decode card may then be slid to the left to plug the lead line free ends (not shown) into associated ones of connectors 62-68. Connectors 62–68 are also each permanently electrically connected to a unique pair of conductive leads 70–72, 74–76, 78–80, and 82–84, respectively. Leads 70–84 form part of an authentication test circuit 86 mounted to the underside of cover 28 and accommodated within base 26.

As shown in FIGS. 6 and 7, test circuit 86 includes two pairs of electric light bulbs 88–90 and 92–94. The bulbs are inserted within apertures (not shown) extending through upper surface 36 of cover 28 so that they may be visually observed by the operator of reader 24. As shown in FIG. 7, one terminal bulb 88 is connected to lead 70 and the other terminal thereof is connected to the positive terminal of a conventional dc power supply 98. Similarly, one terminal of each of bulbs 90, 92 and 94 are respectively connected to leads 74, 78 and 82; whereas the other terminals of bulbs 90, 92 and 94 are connected to the positive terminal of power supply 98. Leads 72, 76, 80 and 84 are each coupled to the negative terminal of power supply 98.

In the above manner, each bulb is in series with the power supply and the associated embossed dot on decode card 50. Current will flow through and thereby light each bulb only when the associated embossed dot on card 50 is mated in contact with the conductive ink filled in the depression formed in surface 14 by a conductive ink filled embossed dot of card 10. When the embossed dot on card 10, to which such associated embossed dot on card 50 is mated, is not filled with conductive ink, but rather nonconductive ink, then the associated bulb will not light.

Test circuit 86 further includes a bulb test switch 100 having an actuating button or switch extending from upper surface 36 of cover 28. Switch 100 is preferably a single-pole single-throw switch having one terminal connected to the negative terminal of power supply 98 and another terminal connected to each of lead lines 70, 74, 78 and 82. In this manner, when switch 100 is closed, a circuit path is completed through each bulb and the battery so that all the bulbs should light if they are good. If one fails to light, it may be replaced.

Reader 24 further includes an actuating button 200 which extends through subsurface 42 of cover 28 and into the space formed in upper surface 36 by indentation 40. Actuating button 200 is specifically located near one corner of indentation 40 and apart from notches 40a and 40b.

Button 200 is a conventional switching mechanism which, as shown in FIG. 7, is coupled between power supply 98 and switch 100 to selectively open or close circuit 86. Specifically, actuating button 200 is normally spring biased upwardly above subsurface 42 and, in such state, maintains circuit 86 opened. When a card is positioned on top of button 200 with a transaction slip thereabove, the button is depressed when the roller is moved across the card which thereby electrically closes circuit 86. Circuit 86 is maintained closed for a finite time sufficient to read the light bulbs. In other words, the authentication test circuitry of card reader 24 is operational only when button 200 is depressed.

The reason for the latter is so that conventional rectangular-shaped credit cards may be positioned in indentation 40 against notches 40a and 40b without depressing button 200 and thereby actuating test circuit 86. Button 200, therefore, maintains test circuit 86 off unless and until a card is placed in indentation 40 and a transaction slip is imprinted upon thereby depressing the button.

Preferably, button 200 also connects a conventional digital counter (not shown) to power supply 98 so that when button 200 is depressed, the counter is driven up one count. Counters which count up one digit each time the input goes from zero voltage to the voltage of a power supply are well known in the art and thus will not be further discussed. Alternatively, button 200 could, using conventional means, mechanically connect to a conventional mechanical counter instead of being in circuit. Further, specific switching buttons performing the function of button 200, as above described, are well known in the art and also will not be further discussed herein.

In order to insure that the upper surface of a credit card 10 placed in indentation 40 will be coplanar with upper surface 36 of reader 24 so that a transaction may properly take place, a "dummy" button 202 in included on the opposite side of indentation 40. Button 202 merely provides a balanced bias for the card to overcome on both of its sides. Button 202 in no way actuates or controls test circuit 86.

The implementation and operation of the card authentication system of this invention is now described with reference to all of the figures. To reiterate, it is an important aspect of this invention to provide essentially fraud-free use of credit card 10. Card 10 is perfectly symmetrical visually about its center so that it is impossible to visually discern any unique edge of the card.

In accordance with the system of this invention, when a credit card number is assigned to a potential credit card user, such user receives a card from the company, such as card 10, having embossed areas A–D and embossed and coded areas E–M. The credit card user will receive the card during a particular month and will be notified as to a specific valid authentication position of the card for that particular month as indicated by a particular valid edge of the card that must be inserted in a predetermined reference position within indentation 40 of upper surface 36. For example, the predetermined reference position may be a side wall 9 of indentation 40, i.e., the valid edge of the card must be positioned closest wall 9 when card 10 is inserted in indentaion 40 on top of decode card 50.

Suppose, for example, that the card user recives his car in March, 1972 and is instructed that edge 20 is the valid edge, i.e., the proper authentication position of the card 10 for insertion in indentation 40 above decode card 50 is with edge 20 thereof closest side wall 9. Such instruction may be accomplished in a variety of ways, such as by indicating edge 20 with an arrow pointing thereto on the jacket carrying the card when it is received by the card user. This jacket (not shown) may be discarded as soon as the card is received and the credit card then positioned in the card user's wallet with the valid edge for the month always at a known reference position in the wallet, such position being adopted by the card user so that he, and only he, may know which is the valid edge of the card for any particular month. It should be noted that the card and the instructions as to its valid edge (e.g., the jacket with the arrow) may be in different mailings. It should be further noted that the reference position in the card user's wallet need never change.

From what has been stated theretofore, edge 20 is associated with and is defined by the binary word in authentication zone L, i.e., "1–0." The valid edge of each credit card issued in the system will vary depending on the binary word defined in the encoded-information zones of each card. More specifically, each month a unique decode card 50 is issued to all sellers of goods or services registered with the credit card company. Each month's decode card has a unique pair of conductively coated embossed dots 52, such as those at bit positions 2 and 6 of card 50, e.g., which are in circuit 86. The binary value of the embossed dots at these bit positions on card 10 will, of course, vary with the credit card issued depending on the binary word stored in each encodedinformation zone on the card, such being determined by the credit card number of the card user in the manner described above.

The credit card company knowing the binary state of bit positions 2 and 6 (i.e., the third and seventh bit positons) of the encoded-information zones on each credit card it has issued, will correspondingly assign, as a valid edge for that month, the edge on each credit card, that, when placed in the predetermined reference position on top of decode card 50 in the credit card reader/imprinter, will cause the proper authentication zone to be read in the manner abovedescribed.

As an example, and as indicated above, consider credit card 10 wherein the bit position 2 on each encodedinformation zone is a binary "1" and the bit position 6 is a binary "0." Therefore, regardless of which edge of card 10 is positioned adjacent sidewall 45, bulb 92 will always light and bulb 94 will always remain dark since the conductive ink in the embossed dots at bit position 2 on each encoded-information zone, when mated with the aligned conductively coated dot 52 on card 50, will complete a circuit path across the two conductive halves of such embossed dot. Correspondingly, since there is no conductive ink in the embossed dot at bit position 6 an open circuit maintains across that position embossed dot 52 on decode card 50.

It can thus be said that the state of bit positions 2 and 6 on each encoded-information zone, in the above example, cooperate to preselect one edge of the card as the single valid edge for insertion in a preselected reference position on the reader, i.e., adjacent wall 9. Stated another way, the binary states of bit positions 2 and 6 on each encodedinformation zone of card 10 cooperate to preselect one of the four possible authentication positions of the card as a single proper authentication position.

Furthermore, the state of bulbs 92 and 94 provide a visual indication of the preselected valid edge and thus single proper authentication position. Card 10 must then be inserted within indentation 40 of upper surface 36 of reader 24 so that the embossed dots on zone L mate with embossed dots 56 on decode card 50. Only then will bulbs 88 and 90 have the same on/off states as bulbs 92 and 94, respectively.

Thus, in the above examples, if edge 20 of the card is in its porper position, i.e., closest sidewall 9, then the embossed dots of authentication zone L will be mated with embossed dots 56 of decode card 50 so that bulb 88 is caused to light and bulb 90 remains dark (it being remembered that test circuit 86 is actuated by card 10 depressing button 200 when placed in indentation 40). It thus becomes visually apparent to the operator that the card has been inserted properly since bulb 92 is lit and bulb 94 is dark. There is thus a matching between the actual card position, as indicated by the state of bulbs 88 and 90, and the preselected single proper card position, as indicated by the state of bulbs 92 and 94.

Suppose that the registered card holder lost his wallet, or that his card fell out of his wallet or he otherwise lost or misplaced the card. A person finding the card would not know of the valid edge thereof for the instant month. If such person sought to use the card, the probability is that he would insert it incorrectly in reader 24, although it should be recognized that the possibility exists of a valid insertion.

Let us assume now that the person who has found the lost card inserts it in a manner such that edge 22 is closest to sidewall 9 of indentation 40. This means that the embossed dots of authentication zone M will be mated with embossed dots 56 on decode card 50. Since both of the embossed dots in zone M contain conductive ink, both of bulbs 88 and 90 will light. However, bulb 92 will remain lit and bulb 94 will remain off since information zone H, which is now aligned with embossed dots 52 of card 50, has its bit position 2 containing conductive ink and its bit position 6 having no conductive ink.

The operator then visually detects the lack of correspondence between the actual position of the card, as indicated by the state of bulbs 88 and 90 (1–1), and the preselected single proper authentication position of the card, as indicated by the state of bulbs 92 and 94 (1–0). The card is thus being improperly used so that the transaction will not take place. Preferably, the card will be immediately confiscated by the operator and seller of the goods and services and returned to the credit card company.

The inconvenience that might result from a proper card user improperly inserting the card in the reader, or by him giving it to an attendant with incorrect instructions on how to insert the card, is far outweighed by the beneficial fraud-reducing features of this system. If, however unfortunately, a person drops his credit card, he should immediately return it to the credit card company and receive it back with new instructions as to the valid edge and thus authentication position.

As indicated before, it is preferred that the credit card company issue a statement each month informing the card user of the valid edge for the next month. This may be accomplished by instructing the card holder to rotate, clockwise or counterclockwise, his card either 90°, 180° or 270° relative to the previous proper authentication position. Of course, the instructions to each credit card holder concerning a new valid edge may vary depending upon which two embossed dots 52 on the new decode card will contain conductive ink, it being noted that the binary word in the encoded-information zones of each credit card most often differ.

Although the invention has been described with regard to a presently preferred embodiment, the invention is not limited to such embodiment, but rather includes obvious modifications, changes and additions thereto, only some of which are described below.

For example, it is not essential for the binary coded words on the encoded-information and encoded-authentication zones to be defined by unique arrangements of energytranslative and non-energy-translative embossed dots. Rather, the energy-translating material, e.g., electrically conductive ink, can be affixed as painted dots directly to a planar surface of card 10 provided the spacial and positional relationship between the dots is identical to that shown on the card 10. Correspondingly, the decode card need not be embossed, but may have similar ink dots painted directly onto surface 54 thereof.

The layer of ink at each dot position, i.e., binary bit position, would, of course, have to be thick enough so that opposing aligned dots on the cards contact them when the credit card is placed on top of the decode card and also so that the ink would not soon rub away by abrasion. As with decode card 50, this new decode card's dots would preferably contain two separate ink-halves with a nonconductive space in between, each half being connected to an associated lead line 58 in the manner and for the reasons above-described.

As another example, the number of possible authentication positions of a square-shaped credit card may be increased from four to eight. This may be accomplished by affixing two identical cards, similar to card 10, in back-to-back relationship. There would thus be four possible ways of inserting the card when one side thereof contacts decode card 50, and four other possible ways of inserting the card when the other side thereof contacts decode card 50.

With this type of system it would, of course, be necessary to modify the reading apparatus and card by having the conductive ink coated on the exterior surfaces of the credit card in the spaces between adjacent embossed dots. This further has the advantage of preventing abrasion of the ink through normal handling of the card.

When using a double-layer credit card so structured and designed for eight possible authentication positions, it is of course necessary to fabricate it with a minimum of three binary bit positions in each encoded-authentication zone on each surface. This is true since there are eight different binary states for three bit positions. Each encoded-authentication zone of such a card has a unique binary coded word to form one of the possible eight bit binary words. Similarly, three light bulbs would be required in decoding circuit 86 to correspond to the three bits of the encoded-authentication zone. Three bits instead of two would, of course, be selected from the encoded-information zone and be associated respectively with another three light bulbs to indicate the values of the three bits. There would thus be six light bulbs altogether in circuit 86.

It is further preferred that each encoded-information zone contain at least eight embossed dots defined, as to being electrically conductive or not electrically conductive, in a manner similar to that of defining the ten embossed dots for each encoded-information zone of card 10.

As an alternative to the above, a single card may be fabricated having encoded-information and encoded-authentication zones on both sides thereof. However, the imprintedinformation zones A–D would only be on one side. Thus, the credit card could not always be imprinted from and authenicated with respect to its use, with one placement of the card.

In the future, it might be desirable to eliminate the need for transaction slip imprinters as a means for recording transactions. Thus, a central credit data memory bank of a computer might be used wherein the binary word in each encoded-information zone, in this case containing the required number of bit positions to uniquely define each card, is sensed to address the memory for appropriate information to be read from or to the memory concerning the credit card holder and the particular transaction. If this comes to pass, then imprinted-information zones A–D, including the embossed information thereof, may be eliminated entirely as being unnecessary.

In accordance with this invention, it is not essential for the credit card to be physically symmetrical about its center, e.g., square, although such is preferred. Additionally, the positional relationships between the encoded-authentication zones and encoded-information zones need not be restricted to that shown on card 10. All that is required is that the encoded bit positions in a single information zone and those in a corresponding authentication zone are simultaneously read and decoded. Thus, the arrangement shown in card 101 of FIG. 10 could also be used. With card 101, only one imprinted-information zone 102 is needed.

In certain instances it might be desirable to eliminate the requirement of the credit card company sending out a statement each month informing the card user of the valid edge for the next month when the card user has not used his card for the preceding month thereby making such statement unnecessary. This could be accomplished by providing an area on the card for designating the last month in which the card was used. such as by marking an appropriate box or punching out an appropriate stub. Correspondingly, the decode card associated with the last month of valid use of the card would be inserted in the reader or reader/imprinter for use with the credit card, i.e., the holder could use the valid edge assigned to the last month he used the card. As soon as the card is used, the operator would appropriately mark the card to indicate it had been used that month. However, the card holder could continue to use the card in accordance with his instructions for the month last previously used until the end of the next month. He would receive new instructions for orienting the card for the month following such next month with his next statement in the mail.

It should be noted that the card holder must always be told how to use his card for the first two months.

Although this latter system may add to the manipulations that must be performed by the operator, such might be justified in terms of economics when considering the elimination of unnecessary monthly statements.

To further insure the absence of fraud in the credit card authentication system of this invention, the card reader 24 may be modified to lock each decode card 50 in the reader during the month of its use.

In the above regard, a modified card reader 24' is shown in FIG. 11 having a base 26' which includes a top surface 27 and four peripheral sidewalls 29a–d. A cover 28' is hinged at its rear lower edge 28a' to the top edge of rear sidewall 29d. Cover 28' may then be pivoted open to reveal the underside of the cover and top surface 27 of base 26'.

Cover 28', like cover 28, includes indentations identical to indentations 40 and 44 and hereinafter referred to as indentations 40'' and 44'' for purposes of simplicity. Indentation 40'' (not shown) extends from an upper surface 36' down to a first subsurface (not shown) identical to subsurface 42. The interior of cover 28' is hollowed out except at the front and rear portions thereof containing grooves 30', identical as grooves 30 of cover 28. An underside 43 of cover 28' is thus revealed when the cover is pivoted open.

Cover 28' is hollowed out such that the distance between upper surface 36' and underside 43 equals the combined depth of indentations 40'' and 44''. In this manner, an aperture 44'', identical in length and width as indentation 44, will be formed through the cover. Aperture 44'' is designed to receive a decode card 50 of this invention. Circuit 86 (not shown) is preferably printed directly on surface 43 with indication bulbs 88–94 (not shown) being mounted directly in corresponding holes (not shown) through the cover. Circuit 86, including all leads and switches as well as print wheels 48, have been deleted from the drawing merely for purposes of clarity.

A surface 45', on which decode card 50 will rest when positioned in aperture 44'' with the cover closed, is formed on the top surface of a platform 31 raised above top surface 27 of base 26'. More specifically, the extent to which platform 31 projects above surface 27 is equal to the extent to which cover 28' is hollowed out so that when cover 28' is closed, surface 45' will contact surface 43. In this regard, platform 31 is preferably at least as great as and, more preferably, slightly longer than, aperture 44''.

It will be recalled that a surface 45, identical in purpose as surface 45', was actually formed in cover 28 of reader 24 by indentation 44. The reasons for hollowing out cover 28' in the manner above described and providing surface 45' on platform 31 is more fully described below.

Platform 31 further includes an elongate ridge 33 raised above surface 45' a distance substantially equal to the depth of aperture 44''. The length of ridge 33 is no greater than the width of aperture 44'' and is spaced from a left edge 31a of platform 31 substantially the same distance as the length of a decode card 50.

In operation, cover 38' is raised to expose underside 43 and platform 31. Decode card 50 is then positioned in aperture 44'' at the right side thereof and is then slid over to the left so that its leads 58 plug into respective ones of connectors 62–68. Cover 28' is then closed so that card 50 rests on surface 45' of platform 31 with ridge 33 forming a boundary inhibiting card 50 from being unplugged and slid back to the right.

Preferably, cover 28' is locked to base 26' when closed. This may be accomplished by any known conventional locking assembly, such as locking flanges 6–6' in combination with a standard padlock (not shown). This would enable only a person of authority in the seller's business to open the reader, i.e., to possess the key for the reader. The decode card may thus be removed only by the holder of the key which will prevent unauthorized persons from removing card 50 and electrically determining which two of dots 15 are the monthly preselected dots defining the single proper authentication position of the card.

It will be recalled that it is unnecessary for the credit card company to send out a statement each month informing a card user of the valid edge for the next month where he has not used his card for awhile and thus had no activity to register on a statement. A way of eliminating the requirement of such a statement has been described above, and as will be recalled, required, among other things, that a number of months' decode cards be available to the seller so that he could insert the decode card associated with the last month of use by the card user. (For example, if the last month of the card use was in March, the card holder's March bill wuold arrive in April, which would give the May valid edge information, the previous statement giving the April valid edge information. Thus, the card holder would continue to use the valid edge for May.)

Another aspect of this invention facilitates the required switching of monthly decode cards in the abovedescribed statement-limiting system. More specifically, reference is had to FIGS. 22 and 23 wherein a reader 400 is shown. Reader 400 is very similar to reader 24' of FIG. 11, such as having a hollowed out cover which is identical in length and width, but is preferably deeper than cover 28' to enable the rotation of the drum 420 (discussed below) thereunder.

Reader 400 differs from reader 24' in the following respects. First, an identation 401, similar to indentation 44 (aperture 44') has been extended in its elongate direction so that it is now coextensive, at its right edge, with the right edge of an indentation 40' (i.e., right edge of notch 40a in FIG. 6). Second, and as more clearly shown in FIG. 23, connectors 62–68 have ben replaced with conductive spring clips 402–416 which receive and lock the pins of a decode card when the card is moved upwardly into the space formed by indentation 44'. The significance of this difference is more clearly described below.

A third difference of reader 400 from reader 24' may be seen in FIG. 24 which is a view of a segment of the base 415 of reader 400. As can be seen, platform 31 of reader 24' has been eliminated from the base of reader 400 and replaced by a decode card selector assembly 418 which includes a decide card mounting drum 420 which is rotatable about a shaft 422, which projects from opposite ends of the cover of reader 400. Drum 420 may be any rectangular prism having rectangular sides substantially coexensive with decode cards 424. For purposes of example, the drum is shown as four-sided.

Base 415 is preferably solid and has an indentation 426 defined in a top surface 428 thereof, indentation 426 extending downwardly to a floor 429 (FIG. 23) which is preferably at a distance from top surface 428 at least equal to one-half the maximum diagonal dimension of drum 420 (in the plane of FIG. 23). Drum 420 is positioned in the space formed by indentation 426 with its shaft 422 resting on top surface 428 and with one exposed segment thereof positioned through a conventional U-shaped guide 430 affixed to surface 428 near indentation 426 and through a conventional detent and guide assembly (not shown) near the right edge of the base. The end of this segment of the shaft is affixed to a turnable knob (not shown) located off the right edge of base 415. The other exposed segment of the shaft is positioned through an identical detent and guide assembly 432 to a turnable knob 435 located off the left edge of the base.

Detent and guide assemblies 432 are both conventional devices which each performs three functions. First, they guide the vertical movement of shaft 422 within a channel 423. Second, and as shown in FIG. 29, they permit substantially free rotation of shaft 422 about its axis when the shaft is at the bottom of channel 423 in contact with upper surface 428 of base 415. Third, assemblies 432 includes a pair of detent recesses 450 within the opposing inner sidewalls 452 and near the top thereof, said recesses capable of receiving an opposing pair of four flanges 433 extending at 90° intervals about shaft 422 near each end thereof to thereby lock both the rotational and vertical position of the shaft and thus drum 420 as well. The precise manner of operating assembly 418 is described below.

It should be noted that the sides of the cover of reader 400 have grooves (not shown) to accept shaft 422 when the cover is closed, the grooves permitting vertical and rotational movement of the shaft.

Referring now to decode cards 424 and to FIGS. 25–28, cards 424 are substantially identical in all respects to cards 50 except that they are slightly more elongate than cards 50 so as to be substantially coextensive with the space in the cover of reader 400 formed by indentation 401. Further, each of cards 424 preferably has an elongate bar 434 cemented to the card at one end thereof. Each bar 434 extends vertically a distance equal to the depth of indentation 40' and contains distinct decode card date information embossed thereon, as shown in FIG. 25.

In describing the manner of mounting four decode cards 424 to drum 420, reference is had to FIG. 24 wherein the drum is shown in perspective without cards mounted thereon. Specifically, each of the four planar side surfaces of drum 420 has a planar extension to act as a boundary guide against which a decode card placed on an adjacent side surface will abut (see FIG. 23).

Each side surface of drum 420 preferably has a pressure-sensitive adhesive material over its entire extent for holding fast a card forceably pressed thereon. Of course, the adhesive material is such as to permit removal of the card. Such removal is preferably facilitated by the provision of a plurality of notches 460 each recessed at the intersection of a surface of the drum and one end surface thereof (see FIG. 24).

As will be realized, numerous other ways may be employed to releasably mount the decode cards to the drum side surfaces, such as pressure fitting and other methods.

In operation, and with the cover of reader 400 closed and preferably locked, the credit card user presents the card, such as card 10 (modified to include a month marking area which indicates the last month of use) to the seller with instructions as to which edge is the valid edge as per the last instructions received. The seller then rotates drum 420 until the decode card appropriate for the month marked on the credit card shows through the reader. Then, the seller raises knobs 435 to move shaft 422 upwardly in assemblies 432 until the shaft locks within the detent recesses 450. In this position, as stated above, the shaft will be restrained from further movement. Further, as the drum is raised in the above manner, the pins of the selected decode card 424 will be received within the corresponding conductive spring clips 402–416. Thus, with the drum locked in place, the selected decode card will be in circuit with circuit 86 (not shown) and the major upper surface thereof will be coplanar with subsurface 42' of the reader cover. The minor upper surface 434 will be coplanar with the top surface of reader 400.

Now, the seller places the credit card on top of the decode card in an authentication position within the space formed by indentation 40'. In this arrangement, bar 434 of card 424 will be coplanar with the credit card so that its embossed date information will be imprinted along with the embossed data on the credit card. A transaction slip is then placed above the credit card and the transaction carried out with the authentication position indication noted on the indicator bulbs 88–90 (FIG. 6) of the reader.

When the transaction slips are submitted by the seller to the credit card company for payment, the company will know exactly which month's decode card was used, to insure that the operator (seller) used the reader correctly.

Referring now to another aspect of this invention, in certain instances information cards including only encoded-authentication zones may be employed, such as where the cards are used as "keys" for locks, or where it is only necessary to provide an indication as to the legitimacy of the bearer of the card, such as in an on-line computer system to access a computer memory. Both of these uses require only that the card be inserted in a single proper authentication position which is determined by the unique binary word stored in that one of the encoded-authentication zones which is associated with said single proper authentication position. Referring to card 10 as an example, encoded-information zones F–H, as well as embossed-information zones A–D may all be eliminated, leaving only encoded-authentication zones J–M.

When it is only desired to recognize the legitimacy of the card bearer, a card, such as card 10, but modified in the manner above described, may be read by a reader similar to reader 24 of the system of FIG. 5, but which has been modified so that either or both bulbs 88 and 90 may be manually excited to indicate a single proper authentication position for the card in the reader. Then, a decode card similar to card 50, but modified to have only dots 56 and not dots 52, could read the authentication zone associated with the actual position of the card in the reader and provide an indication thereof on bulbs 92 and 94. If the binary word indicated on bulbs 92 and 94 matches that manually set on bulbs 88 and 90, the legitimacy of the card bearer will be recognized for subsequent transactions.

It should be noted that another use of a system employing a credit card having only encoded-authentication zones is as a "card key" to automatically cause a computer to unlock a lock. It can also be used to establish card bearer legitimacy for use of the card. Yet another use could be to unscramble a scrambled television signal where only one encoded-information zone contained a word which, when read, would cause the reading circuit to generate an unscrambling signal. Such a card would automatically lock in the television set when inserted, and would be automatically unlocked at a later time to prevent the reception of an unscrambled television signal.

As pointed out previously, it is not essential for the energy-translative and non-energy-translative areas in the encoded-authentication zones to be defined by electrically conductive ink dots, whether painted in embossed dots or directly onto the card. For example, and with reference to FIG. 12, a square card 210 is shown having only four encoded-authentication zones 212–218 thereon, corresponding, respectively, to the four card edges. The authentication zones 212–218 thereof may be defined by strips of magnetic tape with a unique coded word magnetically recorded on each strip. Preferably, a binary code is used, although the use of any magnetic coding scheme may be employed, such as analog or digital. The words may be of any desired bit length. Preferably, the length of the binary word in each zone will be large enough to contain a binary coded number equal to "$n$" times the maximum number of issuable cards when "$n$" is the number of possible authentication positions on each credit card, i.e., for each card there are "$n-1$" invalid numbers, corresponding to invalid edges, and one valid number corresponding to the single valid edge.

Card 210 may be read by any conventional magnetic tape reading device capable of reading a strip of magnetic tape fixed in position on a card. Such readers could include those types which case the card, and thus the tape strip, to move past a fixed read-head, or those which cause a read-head to scan the strip on a fixed card. Either of such reader types are within the knowledge of those skilled in the art and thus will not be further discussed herein.

In another embodiment of this invention not requiring the use of conductive ink, a card 310 is shown in FIG. 19 having four authentication zones 312, 314, 316 and 318 each defined by a unique color coded retroreflective strip. By the term "retroreflective" it is meant that light striking the strip at any angle of incidence is reflected back upon its original path of incidence. These types of strips are known in the art and thus will not be further described herein.

Each strip is coded by color and spacing. More specifically, each strip preferably has a distinct combination and arrangement of multicolored bars to define a unique optically readable coded word. For example, and as shown in FIG. 19, the strip in zone 312 preferably has several different colors. The colors, the positions of the colors and the spacing between the colors is in combination unique to each strip.

Card 310 is preferably read by an optical reader at a distance to eliminate the time required to precisely insert the card in the reader. Optical readers designed to read retroreflected light are known in the art. One such reader is currently being manufactured by the Identicon Corporation of Waltham, Massachusetts. Basically, this reader uses a beam of light to scan a retroreflective strip on a card.

As with each embodiment of this invention, the coded word defined in only one authentication zone of each card determines the single proper authentication position of the card relative to the reader. Thus, the card user must position the card so that the light beam scans the strip defined in the single proper authentication zone.

An alternative embodiment of an optically readable card is one in which the card's authentication zones contain light-transmittive areas instead of retroreflective areas.

Still another alternative embodiment of an optically readable card is one in which the card's authentication zones contain a hologram, each zone containing a different unique hologram, or each zone containing a unique portion of a single hologram. A device which reads holograms on a card is currently being used by Radio Corporation of America (RCA) as a device which serves to identify the user of the card containing the hologram as a person who should be allowed to enter a restricted area. The RCA system, however, does not use a position-authentication system, the system of this invention. Thus anyone finding or stealing the RCA hologram card can by using said card gain admittance to the restricted area. It is to prevent such unauthorized use of information-bearing devices that this position-authentication invention is directed.

As another example of a system not requiring the desired binary coded words to be defined by the absence or presence of conductive ink, the absence or presence of embossed dots at the bit positions in each zone may define the desired binary words.

Figure 13:
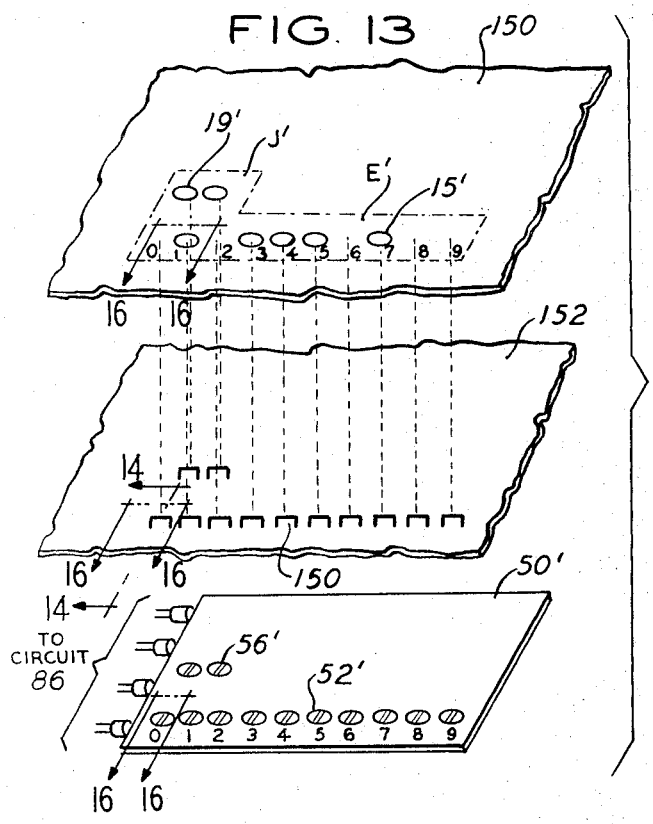
FIG. 13 is an exploded perspective view of another credit card of this invention as disposed on a plate which rests on top of the decode card of FIG. 7.

More specifically, reference is had to FIG. 13 wherein such an alternative system is shown having a credit card 150. Card 150 is similar to card 10 in that it is preferably square in shape having four edges (not shown), four encoded information zones E'–H' (only zone E' being shown for purposes of example) and four encoded-authentication zones J'–M' (only zone J' being shown for purposes of example). As with zones J–M of card 10, zones J'–M' of card 150 are preferably positioned symmetrically about the card center and are each respectively associated with a distinct card edge and thus distinct corresponding authentication position of the card in a card reader, such as reader 24' (FIG. 11).

Card 150 differs from card 10 in that the desired binary words are defined in each of zones E'–M' by the presence or absence of embossed dots at the bit positions of such zone. For purposes of example, the presence of an embossed dot in a bit position shall indicate a binary "0, " whereas the absence of an embossed dot shall indicate a binary "1."

As will be recalled for a four-edged credit card, each encoded-information zone thereon preferably has 10 bit positions 0–9 with the identical binary word stored in each such zone. As shown in FIG. 13, the binary word stored in each of encoded-information zones E'–H' is 1010001011 which is defined by the presence of a plurality of embossed dots 15' located only at bit positions 1, 3, 4, 5 and 7. Similarly, a unique two-bit binary word is stored in each of encoded-authentication zones J'–M' by a unique assemblage of embossed dots 19' in each such zone. Zone J', for example, has a two-bit binary word "0—0" stored therein as defined by the presence of an embossed dot 19' in each of its two bit positions.

A decode card 50', identical in all respects to decode card 50 of the system of FIG. 7, is coupled to a decode circuit (not shown) identical to circuit 86. Further, card 50' is adapted to be plugged into the connectors 62–68 of reader 24' and positioned in indentation 44" thereof.

Figure 14:
FIG. 14 is a cross-sectional view of a segment of the plate of FIG. 13 taken along lines 14—14 of FIG. 13 and showing a conductive member of said plate in one of two states.

In accordance with this invention, an electrically conductive metallic sheet, such as a copper sheet 152, is provided. Sheet 152 is preferably of the identical configuration as credit card 150 and is adapted to be positioned in indentation 40" above decode card 50'. Sheet 152 has a plurality of punched-out leaf springs 154 (FIGS. 13 and 14). Each spring forms an integral part of the sheet and is generally L-shaped including an inclined portion 156 having a perpendicular downwardly extending flange 158.

Each spring 154 is dimensioned so that when card 150 is positioned thereabove, the spring may be received within a depression defined in the underside of card 150 by an embossed dot thereon. The spring will thus not be depressed by the lower surface of the card. Alternatively, the spring is adapted to be depressed with flange 158 extending beneath sheet 152 when a nonembossed part of the card lower surface is forced against the spring, such occurring when the roller is reciprocated back and forth card 150.

Springs 154 are arranged in two rows identical in positional relation and number as the bit positions of zones J' and E'. More specifically, one row has 10 springs 154 and another row has two springs 154, the one row being positioned on sheet 152 for alignment with bit positions 0–9 of an encoded-information zone on card 150 when the card is positioned on top of the sheet in indentation 40". Similarly, the other row of two springs is positioned for alignment with the two bit positions of the associated encoded-authentication zone.

Figure 17:
FIG. 17 is a cross-sectional view of another segment of the plate of FIG. 13 showing another conductive member in one of its states and disposed within the interior depression of an embossed member on the credit card of FIG. 13.

In operation, decode card 50' is inserted in indentation 44" and is then plugged into connectors 62–68. Sheet 152 is permanently affixed to the bottom surface of indentation 40" as to be positioned on top of decode card 50'. Then, card 150 is positioned on top of sheet 152 in indentation 40 with zones E' and J' in reading position. The leaf springs aligned with bit positions 1, 3, 4, 5 and 7 of zone E' will thus be received in the depressions formed in the lower surface of card 150 by the embossed dots 15' at such bit positions (see FIG. 17); similarly, the leaf springs aligned with the two bit positions of zone J' will be received in the depressions formed by embossed dots 19'.

Figure 15:
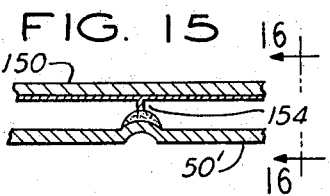
FIG. 15 is a cross-sectional view of the same plate segment of FIG. 14 shown between the credit and decode cards with the conductive member thereof in the other of its two states and in contact with an energy-translative area on the decode card.
Figure 16:
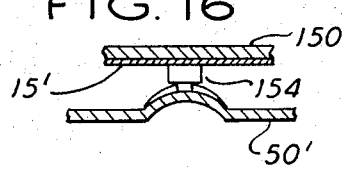
FIG. 16 is another cross-sectional view of the arrangement shown in FIG. 15, taken along lines 16—16 of FIG. 15.

A transaction slip is then positioned on top of card 150 followed by the roller being reciprocated back and forth riding in grooves 30'. As the roller passes over card 150, it forces the card against sheet 152 which causes all those leaf springs aligned with a bit position in zones J' and E' having no embossed dot therein to be depressed so that flange 158 of each such spring contacts, and completes a circuit across, the two conductive ink halves of an aligned dot 52' or 58' of decode card 50' (see FIGS. 15 and 16). All those leaf springs aligned with an embossed dot 15' or 19' will not be depressed since they will be received within the depression in the lower surface of card 150 formed by such embossed dot.

Since the roller also causes card 150 to depress button 200 thereby closing circuit 86, the result is that each of bulbs 88 and 90 will be energized only if there is no embossed dot at the corresponding bit position on the encoded-authentication zone read.

Assuming that bit positions 2 and 6 of decode card 50' are in circuit with bulbs 92 and 94 in circuit 86, and that zones E' and J' are read when the card is positioned in indentation 40", both of bulbs 92 and 94 will light since neither of bit positions 2 and 6 on zone E' contain an embossed dot; whereas neither of bulbs 88 and 90 will light since each bit position of zone J' contains an embossed dot. The actual authentication position of card 150 is thus "0—0," as indicated by the state of bulbs 88 and 90, and the single proper authentication position is "1—1," as indicated by the state of bulbs 92 and 94. Since there is no match, an improper use of the card is indicated.

In a further aspect of the above alternative system, it is noted that the binary words of each encoded zone, both information and authentication, will be imprinted on the transaction slip. It thus becomes possible for the credit card company to verify that the credit card was used in its single proper authentication position when the transaction was recorded.

More specifically, a conventional optical scanning instrument could optically read the binary words imprinted on the transaction slip in the encoded-information zone area and encoded-authentication zone area associated with the actual authentication position of the card in the reader, such as, for example, the imprinted binary data closest to and parallel with the bottom edge of the transaction slip. This information would be fed to a computer which could then note the binary value of each of the month's preselected bit positions on the encoded-information zone optically read and logically compare it with the binary value of each bit position of the encoded-authentication zone optically read. Values which properly compare verify a proper use of the card.

The above system can be used as a check on the honesty of the seller of goods or services. More specifically, and as stated above, a counter (not shown) is preferably driven up one digit each time a transaction takes place with a card of this invention. By optically verifying proper card use, the card company can detect if the seller has, after noting an invalid use in a recorded transaction, permitted the card holder to reinsert the card again and again until it is inserted properly. This is done by comparing the seller's counter reading with the total number of transactions slips from such seller read by the computer. A greater number registered for the month on the counter than that read by the computer indicates an impropriety by the seller.

Although each of the above-described embodiments and modifications thereof deal with proper orientation of a card for eventual reading of one or more encoded zones, thereon, the invention also contemplates a position orientation system for a card or paper per se, such as where the card or paper is used as a mnemonic device.

For example, an airline ticket containing a series of digits indicative or certain ticket information may require the ticket bearer to furnish a parity or check digit. The position orientation system of this invention may be used to insure that the person who presents an issued ticket when boarding the plane is the legitimate ticket holder by furnishing the proper digit. In accordance with this invention, the issuing agent, knowing what the digit is, hands a paper, such as paper 250 of FIG. 18, to the purchaser. Paper 250 has four numbers printed thereon, wherein only one of the numbers corresponds to the digit. When the purchaser is informed of the digit, he may position-orient the paper in his wallet to indicate to him the proper digit so that, without writing it on the ticket or committing it to memory, he may retrieve, or remember, what it is when presenting his ticket for boarding the plane.

Each of the embodiments of this invention described above deal with position orientation system for information-bearing devices, such as cards or other similar substantially planar members. This invention, however, is not to be limited to such information-bearing devices. Thus, these devices may be of any shape having a plurality of distinct edges and a corresponding number of associated information-bearing planar surfaces.

For example, reference is had to FIG. 20, wherein an information-bearing device 350 in the shape of a rectangular prism is shown. The cross section of device 350 is in a plane perpendicular to the elongate axis of the member and may be of any desired polygon shape, octagonal being shown merely for purposes of example.

Thus, device 350 has eight distinct edges 352–366 and eight distinct rectangular surfaces. Each surface has an encoded-authentication zone with an energy-translative area thereon, such as a magnetic tape strip (only strips 368–372 being shown). The tape strip on each surface preferably includes a distinct binary coded word magnetically stored thereon which is associated with a distince edge of device 350. Alternatively, optically reflective strips, such as retroreflective strips 312–316 of card 310 may be used, if desired.

As with each embodiment of this invention, device 350 has a plurality of authentication positions defined when each edge and corresponding authentication zone is disposed in a predetermined reference position relative to a reader. With particular reference to device 350, each authentication position is preferably defined when an authentication zone is positioned in reading relation with a magnetic read head 378 so that the magnetic strip defined on such zone may be read by the head. This concept is more clearly described below.

Device 350 is preferably used as a "key" in a locking system, such system being discussed above. To this end, and with reference to FIG. 21, a keyhole 374 is shown defined in a structure 376, such as a door or gate or the like, the hole being octagonal in shape to conform with the transverse cross-sectional shape of device 350. An electromagnetic transducer, such as read head 378, is preferably mounted within structure 376 with its read face 380 defining one boundary side of the octagonal hole.

In operation, device, or key, 350 is inserted in hole 374 with a particular surface thereof, and thus authentication zone, at the top so that as key 350 is inserted, head 378 will read the information magnetically stored on the magnetic strip in such zone. If the zone including strip 368 is the valid zone for a particular month, it must be at the top when key 350 is inserted, such as shown in FIG. 20. Each month, the key user could be given new instructions concerning which is the new valid authentication zone. To remember this zone, he would then insert the key in a key holder (not shown) with the key's single proper authentication zone adjacent one of a number of inside surfaces having the same geometric arrangement as the key's side surfaces, said one inside surface being selected for permanent use.

It should be noted that device 350 could be used solely as an identification device instead of as a key.

With all information-bearing devices thus far described as part of this invention, the position authentication is based on the device position orientation relative to a reader. In an alternative system of this invention, however, position authentication may be established with respect to the areas themselves on an information-bearing device wherein such areas have no one-to-one correspondence with edges of said device.

Referring to FIG. 30, an information-bearing card 500 is shown. Card 500 contains five strips of magnetic tape 502–510, each strip having a distinct magnetic word recorded thereon, the strips defining five distinct authentication zones. Only one of these zones will be the single proper authentication zone in any one time period. The authentication zones of card 500 are not read by placing the card in a reader. They are preferably read by manually passing a magnetic tape reading device, preferably in the form of a pen 512 (see FIG. 32), over and along the authentication zone that is to be read. Such reading devices are conventional and well known and thus will not be further described herein. Pen 512 is preferably connected by wire to a device (not shown) which translates the signal read by the pen into a number, for display, or processing such as by a computer. Such devices for translation and display, or translation and input to a computer, are conventional and well known and thus will not be further described herein.

Alternatively, the authentication zones may be defined by optically readable strips, each containing a distinct optically readable code thereon. Devices for optically reading such strips, and devices for translating such read codes into numbers, are conventional and well known and thus will not be further described herein.

As with all previously described embodiments of information-bearing devices, only the valid authorized user of the information-bearing device knows the single proper authentication zone. Furthermore, whereas in FIG. 30, the strips 502–510 are shown in an orderly arrangement, such is not essential. For example, reference is had to FIG. 31 wherein strips 502'–510' are shown in a haphazard arrangement on a card 500'.

An alternative embodiment of the invention is disclosed in FIGS. 33 and 34. In this configuration a round indicia-bearing device, e.g., credit card, is provided. The card 610 has a plurality of authentication zones, each authentication zone corresponding to a defined position of the device. Each of these positions is indicated by a numbered radial mark 617. These radial marks as shown in FIG. 33 each have a corresponding groove or other aligning means on the reverse side of the card. The authentication zones have encoded means, such as magnetic tape or other means as described with respect to the previous embodiments, positioned on or within the card, preferably on the same side of the card as the grooves.

To use the card, the card is placed on a reader such as the one shown in FIG. 34. This reader is substantially rectangular in configuration, having a shallow circular opening 613 into which the card fits. A depression 616 extends from the circular opening to aid in removal of the card. Positioned at a point around the opening is a ridge 611 to engage a groove of card 610. Opening 613 also contains a device on its surface to read a single authentication zone on the inserted card 610. Such device is not shown nor described since such devices, such as movable magnetic tape read heads, are conventional and well known in the art. Briefly, the user of the card has to know the single proper authentication zone on his card, in other words, as shown in FIG. 33, there are 10 possible authentication positions around the periphery of the card. The user places the card into the opening in the reader so that this single proper authentication position aligns with ridge 611 on the top surface of the reader. Ridge 611 will fit into one of the grooves in the bottom surface of the card to hold it in this position. The reader is then actuated, such as by flipping switch 612 to supply power to it. The reader will now indicate whether the card has been placed in the proper position therein. In other words, whether the proper authentication position on the card is aligned with the ridge 611 on the reader.

This can be accomplished in many ways including those of the previous embodiments of the invention. For example, only one of the card's possible authentication positions can have valid indicia corresponding to it; all the other possible authentication positions will then have invalid indicia corresponding to them. Alternatively, each position can have a predetermined coded number (card number) in its corresponding authentication zone. This number is the same for all positions and serves to identify the card. each positon will have another number in its authentication zone. These numbers (zone numbers) will be different for each zone. In determining the validity of the card, the card will have to be positioned so that the card number in the single authentication zone to be read will have the proper relationship to the zone number in that authentication zone. For example, the card number could be three; a three would then be encoded in each authentication zone. The zone number would be different for each zone. The reader would then determine proper position if the two numbers has a certain predetermined relationship. For example, if the sum of the two has to be 10, the zone number would then have to be seven so that the single valid position is the one with zone number seven. A further alternative would be where the indicia in a particular position on the card corresponds to indicia within the reader to determine authentication. As aforementioned, with respect to the previous examples, the single proper authentication positions can be variable over time. Conventional electrical circuitry can be used in the above examples for verifying the proper relationship between the numbers and thereby to verify the proper position of the card. Moreover, a portion or all of the circuitry can be changed each month to require a different valid authentication position.

To facilitate the card user knowing the single proper authentication position for each time period, the following system can be used: each time period, e.g., each month the card user is told to use a different radial mark on card 610. He then denotes this mark on the card. His circumferential displacement from this base mark remains constant. For example, if the month's base mark is the bottom-most one in FIG. 33, this mark could be denoted by marking it or by orienting it in a card holder (not shown) so that the card is positioned in the holder with this mark aligned with a reference mark on the holder. Then, for example, if the variable circumferential displacement is two positions clockwise, the single valid authentication. position for the time period is the one two mark spaces clockwise from the base mark. To position the card in the reader so that the single proper authentication zone will be the zone read by the reader, the card is placed in the reader with the mark mating with the reader ridge 611 being the mark that is displaced clockwise from the month's base mark by the constant displacement value.

The two lights 614 and 615 or other indicating means on the top surface of the reader will indicate whether the card's proper use is verified or not, for example, the light 614 can be a green light indicating proper verification and light 615 can be a red light indicating improper card use. In this latter case, the card should be confiscated by the merchant.

The advantage of the round embodiment is that it provides a large number of authentication zones and corresponding aligning positions around its circumference.

In another embodiment of this invention as shown in FIG. 35, a single authentication zone can be read on a plurality of positions of a card 700. In FIG. 35 four positions would be available, each of the positions being defined by one of the four edges of the card. The card includes a central array 702 of data positions 704, some of which would include data and some of which may not include data. The card has one of its four positions as its authentic position. This authentic position of the card is selected by placing the card in a reader so that the correct edge is in a given predetermined relationship with a predetermined edge of the reader. In the correct position the data that is read will indicate that the card was positioned in the authentic position. It will be appreciated that cards are coded with said data such that if the card is inserted in any other position, that is, with any other edge other than the correct edge in the predetermined relationship with the predetermined edge of the reader, the data will still be read but it will not be in the correct relationship to indicate authentication. The card reader can be similar to any of the applicable card-reading apparatus hereinbefore described, or can be implemented by known and conventional techniques.

It will be noted that the data on card 700 can be designed so that it can be read from either side, thus providing eight possible positions, only one of which is the authentic card position. An example of such a datum is a punched hole.

Although the invention has been described with reference to a number of illustrated embodiments and modifications thereto, the invention is not to be so limited. Rather, the precise scope of this invention is to be defined by the following claims.

What is claimed is:

1. A position authentication system for information-bearing devices which are read by a reader, the system comprising:
    a. a first information-bearing device having a plurality of edges and a plurality of device authentication positions, one of which indicates invalidity and one of which validity, each defined when a distinct edge is located at a predesignated reference position relative to the reader;
    b. a plurality of authentication zones defined on the device, each zone being associated with a distinct edge and thus distinct authentication position of the device, and each zone including means for defining a distinct readable code therein;
    c. the reader capable of reading the device in any of its authentication positions and including means for reading a first readable coded word defined in the authentication zone associated with the actual authentication position of the device as read; and
    d. means for indicating validity or invalidity of the readable coded word.

2. The system of claim 1, wherein each readable code is a binary coded word.

3. The system of claim 1, wherein the means for defining a distinct coded word in each authentication zone comprises a magnetic recording medium included in each zone and having said distinct coded word magnetically recorded thereon.

4. The system of claim 1, wherein each code is optically readable.

5. The system of claim 4, wherein the optically readable code in each authentication zone includes a retro-reflective strip having a pattern of optically readable areas thereon.

6. The system of claim 4, wherein the optically readable code in each authentication zone includes a part of a hologram.

7. The system of claim 1, wherein the information-bearing device is a rectangular prism having a plurality of rectangular surfaces, said plurality of edges being defined at the intersections of said surfaces, and said plurality of authentication zones being respectively defined on said plurality of rectangular surfaces.

8. The system of claim 7, wherein each zone contains a magnetic recording medium having a distinct readable coded word recorded thereon.

9. The system of claim 8, wherein each coded word is a binary coded word.

10. The system of claim 1, wherein the information-bearing device is a card.

11. The system of claim 10, wherein each readable code word is a binary coded word.

12. The system of claim 11, wherein:
    a. the first card is substantially planar; and
    b. the card reader has a substantially planar upper surface including an indentation therein which extends down to a subsurface, the indentation defining a space to receive the first card with the upper surface of said first card being substantially coplanar with upper surface of the card reader and with the underside of the first card resting on said subsurface.

13. The system of claim 11, wherein the means for defining a distinct binary coded word in each authentication zone comprises a magnetic recording medium included in each zone and having said distinct binary coded word magnetically recorded thereon.

14. The system of claim 13, wherein the magnetic recording medium includes a strip of magnetic tape.

15. The system of claim 11, wherein the first card is substantially planar and the means for reading a first binary coded word includes:
    a. a plurality of second cards carried by the card reader;
    b. each second card being substantially planar and including a first set of energy-translative areas defined on a surface thereof and positioned for connection with the areas on a particular authentication zone of said first card when the first card is positioned above the second card in one of its authentication positions; and
    c. means included in the card reader for selecting a single second card above which the first card will be placed when inserted in the reader in one of its authentication positions so that the areas on said particular authentication zone of the first card may be connected to the first set of energy-translative areas on said single second card.

16. The system of claim 15, wherein the selecting means includes:
    a. a movable member upon which said plurality of second cards are mounted;

b. means for selectively moving said member to position the single second card so that the first set of energy-translative areas thereon may be connected with the areas in said particular authentication zone of the first card when said first card is inserted in the reader in one of its authentication positions.

17. The system of claim 11 further comprising:
   a. said means for indicating provides a first indication of said first binary coded work read by the reader; and
   b. said means for indicating provides a second indication of a second binary word associated with said one authentication position, the card being inserted in the reader wherein when the first and second indicationa are at a predetermined relationship, validity is indicated.

18. The system of claim 17, wherein each authentication zone contains a plurality of bit positions, and wherein the means for defining a distinct binary coded word in each authentication zone includes a arrangement of embossed areas at selected ones of said bit positions, the presence or absence of an embossed area at each bit position respectively representing the two possible binary states.

19. The system of claim 18, wherein the first card is substantially planar and the means for reading a first binary coded word comprises:
   a. a source of energy;
   b. a second substantially planar card carried on the card reader, said second card including a first set of energy-translative areas defined on a surface thereof and positioned for alignment with the bit positions on a particular authentication zone of the first-mentioned card when said latter card is positioned above the other card in one of its authentication positions; and
   c. means for causing the translation of energy through an energy-translative area on the second card only when the aligned bit position of the first card contains no embossed member.

20. The system of claim 19, wherein:
   a. the source of energy is a source of electricity;
   b. the energy-translative areas on the second card are each defined by a pair of separated electrically conductive members; and
   c. the causing means comprises means connecting each member of each pair of conductive members to a different terminal of the source of electricity, and a plate disposed between the first and second cards and including electrically conductive means thereon for interconnecting the pair of electrically conductive members of each energy-translative area to cause an electrical current flow across such pair of members only when the bit position on the first card that is aligned with such pair of members contains no embossed member thereat.

21. The system of claim 20, wherein the means for providing a first indication of said first binary coded word read includes a first set of indicator lamps respectively associated with the set of energy-translative areas defined on the second card, each lamp being electrically coupled in circuit with the pair of electrically conductive members of an associated energy-translative area and the source of electrical energy.

22. The system of claim 21 wherein the means for indicating one of the card authentication positions as valid includes:
   a. a second set of indicator lamps equal in number to the first set of lamps; and
   b. means for selectively energizing each lamp of said second set of lamps.

23. The system of claim 20, wherein the first card further includes a plurality of encoded-information zones defined on a surface of the card, each encoded-information zone containing a plurality of bit positions with an identical arrangement of embossed areas at selected ones of its bit positions, the presence and absence of embossed areas in each encoded-information zone defining a third binary coded word which is identical in each encoded-information zone, said second binary coded word being included as a subset within said third binary coded word.

24. The system of claim 23 wherein the means for indicating one of the card authentication positions as valid comprises:
   a. a second set of energy-translative areas defined on the second card in the same positional relation relative to the first set of energy-translative areas on said second card as the bit positions in each encoded-information zone of the first card bear to the bit positions in an adjacent authentication zone of the first card, each energy-translative area on said second card being defined by a pair of separate electrically conductive members;
   b. means coupling only selected ones of the second set of energy-translative areas on the second card to the source of energy by connecting each electrically conductive member thereof to a different terminal of said source of electrical energy, said selected ones being equal in number to the first-mentioned plurality of energy-translative areas on the first card, and
   c. the electrically conductive means on the plate also interconnecting the pair of electrically conductive members of each energy-translative area of said second set only when the bit position in an encoded-information zone on the first card that is aligned with such energy-translative area contains no embossed member thereat.

25. The system of claim 24 wherein:
   a. the means for providing a first indication of said first binary coded word read includes a first set of indicator lamps respectively associated with the first mentioned set of energy-translative areas on the second card, each lamp being electrically coupled in circuit with the pair of electrically conductive members of an associated energy-translative area and the source of electrical energy; and
   b. means for indicating one of the card authentication positions as valid further includes a second set of indicator lamps equal in number to the first set of lamps, each lamp of said second set being coupled in circuit with a distinct one of said selected ones of the second set of energy-translative areas on the second card.

26. The system of claim 17, wherein the means for defining a distinct binary coded word in each authentication zone includes an arrangement of areas defined on the surface of the first card in each zone, said areas assuming one of two states, a first state being energy-translative and a second state being non-energytranslative, the states respectively representing the two possible binary states, the number of areas on each zone being equal.

27. The system of claim 26, wherein each area is defined at a corresponding embossed member upstanding from the surface of the first card.

28. The system of claim 27, wherein each area is located within the interior of the embossed member on the underside of the first card.

29. The system of claim 28, wherein the first card is substantially planar and the means for reading said first binary coded word includes a second substantially planar card carried on the card reader, the second card including a plurality of embossed members extending from a surface thereof and being equal in number and positioned identically as the embossed members in each authentication zone of the first card, each embossed member on the second card having energy-translative material defined thereon on the upper surface of the second card, the relation being such that when the first card is positioned in one of its authentication positions in the card reader on top of the second card, the embossed areas on the second card will mate with the interiors of the opposite and aligned embossed members on the first card.

30. the system of claim 29, wherein the energy-translative material on each card is an electrically conductive material.

31. The system of claim 30, wherein the electrically conductive material is electrically conductive ink.

32. The system of claim 31, wherein the electrically conductive ink on each embossed member of the second card is defined in two separated halves which are conductively interconnected only when the embossed member on the first card, which each embossed member on the second card contacts when the first card is positioned on top thereof in one of its authentication positions, contains conductive ink in the interior thereof.

33. The system of claim 32, further including a source of electrical energy and wherein the means for providing a first indication includes a first set of indicator lamps respectively associated with the plurality of embossed members on the second card, each lamp being electrically coupled in circuit with the pair of conductive ink halves on a distinct embossed member on the second card and said source of electrical energy, each lamp lighting only when the pair of conductive ink halves on the associated embossed member are electrically interconnected.

34. The system of claim 33 wherein the means for indicating one of the card authentication positions as the valid position includes:
a. a second set of indicator lamps equal in number to the first set of lamps; and
b. means for selectively energizing each lamp of said second set of lamps.

35. The system of claim 26, wherein the first card is substantially planar and the means for reading a first binary coded word includes a second card carried on the card reader, said second card being substantially planar and including a first set of energy-translative areas defined on a surface thereof and positioned for connection with the areas on a particular authentication zone of the first card when said first card is positioned above the second card in one of its authentication positions.

36. The system of claim 35, wherein the card reader includes means for selectively locking the second card in the reader.

37. The system of claim 35, wherein the card reader further includes:
a. a substantially planar upper surface including an indentation therein extending down to a first subsurface, the indentation defining a space to receive the first card with the upper surface of said first card being substantially coplanar with the upper surface of the card reader and with the underside of the first card resting on said first subsurface; and b. the first subsurface including an indentation therein extending down to a second subsurface and defining a space to receive the second card with the upper surface of said second card being substantially coplanar with said first subsurface and with the underside of the second card resting on the second subsurface.

38. The system of claim 32, wherein the card reader includes means for selectively locking the second card in the reader.

39. The system of claim 38, wherein the reader further comprises:
a. a cover on which is defined the upper surface and first subsurface of the reader;
b. a base to which the cover is hinged and on which is defined the second subsurface of the reader; and c. the second subsurface including means cooperating with the space defined in the first subsurface by the indentation therein for locking the second card in said space when the cover is closed on top of the base.

40. The system of claim 39, wherein said last-mentioned space is more elongate lengthwise than the second card and the locking means includes an elongate ridge defined on the second subsurface, the ridge extending above the second subsurface a distance substantially equal to the thickness of the second card.

41. The system of claim 35, wherein the first card further includes a plurality of encoded-information zones defined on the surface of the card, each encoded-information zone including an arrangement of areas defined on the surface of the card, said areas assuming one of two states, a first state being energy-translative and a second state being non-energy-translative, the areas cooperating to define a third binary coded word which is identical on each encoded-information zone, said second binary coded word being included as a subset within said third binary coded word.

42. The system of claim 41, wherein the non-energy-translative areas on the first card are visually indistinguishable from the energy-translative areas.

43. The system of claim 41, wherein the first card further includes a plurality of imprinted-information zones defined on the surface of the card symmetrically about the center thereof, each imprinted-information zone including embossed information in the form of characters.

44. The system of claim 41 wherein the means for indicating one of the card authentication positions as valid includes:
a. a source of energy
b. a second set of energy-translative areas defined on the second card in the same positional relation relative to the first set of energy-translative areas on said second card as the areas in each encoded-information zone of the first card bear to the areas in an adjacent authentication zone of the first card; and c. means coupling only selected ones of the second set of energy-translative areas on the second card to the source of energy, such selected ones being equal in number to the number of the first mentioned plurality of areas on the first card.

45. The system of claim 44, wherein:
a. the energy-translative areas on the first card are defined by electrically conductive material affixed to the underside of said first card;
b. the source of energy is a source of electricity; and
c. the energy-translative areas on the second card are each defined by two separated halves of electrically conductive material affixed to the top side of said second card.

46. The system of claim 45, wherein each area of the first card is defined at a corresponding embossed member upstanding from the top side of the first card.

47. The system of claim 46, wherein the electrically conductive material defining each energy-translative area of the first card is located in the interior of a corresponding embossed member on the underside of the first card.

48. The system of claim 44, wherein the first card is square in shape and has four authentication zones and four encoded-information zones on the surface thereof, each authentication zone having two areas to form a two-bit binary word, and each encoded-information zone have 10 areas to form a 10-bit binary word common to each encoded-information zone.

49. The system of claim 48, wherein the 10-bit binary word in each encoded-information zone contains an equal number of binary "1" and binary "0" bits as defined by energy-translative areas and non-energy-translative areas, respectively.

50. A method for detecting an unauthorized use of an information-bearing device which has a plurality of distinct edges when said device is positioned relative to a reader for reading the device with an edge of the device adjacent a preselected reference position on the reader, comprising the steps of:
a. establishing a plurality of authentication zones at distinct locations on the device, the zones being equal in number to, and respectively associated with, the device's edges, at least one of said zones being invalid;
b. providing a readable code in each zone;
c. reading a first code defined in the zone associated with the edge of the device located adjacent said preselected reference position when the device is positioned relative to the reader; and
d. indicating said first code so read and if the zone is invalid.

51. The method of claim 50, wherein the information-bearing devices are substantially planar cards and wherein the establishing step includes establishing said plurality of authentication zones at distinct locations on at least one surface of the card.

52. The method of claim 51, further comprising the steps of:
a. preselecting one of said readable codes by providing an indication thereof, such indication representing which edge of the card must be adjacent said preselected reference position when the card is positioned in a card reader; and
b. comparing the latter-mentioned indication with the former-mentioned indication, the card being properly positioned in a card reader only when the two indications are in a predesignated relation.

53. The method of claim 51, further comprising the step of preselecting a different edge of the card each month for location at said predesignated reference position on a card reader by indicating a different one of said readable codes each month.

54. The method of claim 51, wherein the providing step comprises:
a. placing a magnetic storage medium in each zone; and
b. recording a magnetic representation of one of said codes on each magnetic storage medium.

55. The method of claim 51, wherein the providing step comprises:
a. placing an optically readable medium in each zone; and
b. providing a optically readable pattern arrangement on the medium in each zone.

56. An authentication system for authenticating the use of information-bearing devices comrpsing:
a. an information-bearing device including a plurality of authentication zones thereon, each zone containing means for providing a readable code therein wherein the code in at least one authentication zone is a valid code and the code in at least one other authentication zone is an invalid code;
b. means for reading the code in any desired zone; and
c. means for providing an indication of the code so read and indicating if it is a valid or invalid code, an authentic use of the card being indicated only when a valid code is read.

57. The system of claim 56, wherein each code is a digital code.

58. The system of claim 57, wherein each code is a bianry coded word.

59. The system of claim 56, wherein the providing means includes a magnetic recording medium in each zone, each medium having a readable coded word magnetically recorded thereon.

60. The system of claim 59, wherein the reading means includes a reading member which is adapted to be moved over each zone to thereby read the coded word thereon.

61. The system of claim 56, wherein the providing means includes an optically readable pattern in each zone.

62. The system of claim 61, wherein the reading means includes a reading member which is adapted to be moved over each zone to thereby read the coded word thereon.

* * * * *